US009407896B2

(12) United States Patent
Lam et al.

(10) Patent No.: US 9,407,896 B2
(45) Date of Patent: Aug. 2, 2016

(54) MULTI-VIEW SYNTHESIS IN REAL-TIME WITH FALLBACK TO 2D FROM 3D TO REDUCE FLICKER IN LOW OR UNSTABLE STEREO-MATCHING IMAGE REGIONS

(71) Applicant: Hong Kong Applied Science & Technology Research Institute Company Limited, Hong Kong (HK)

(72) Inventors: Che Yuen Brian Lam, Hong Kong (HK); Wei Lun Alan Cheung, Hong Kong (HK)

(73) Assignee: Hong Kong Applied Science and Technology Research Institute Company, Limited, Hong Kong (HK)

( * ) Notice: Subject to any disclaimer, the term of this patent is extended or adjusted under 35 U.S.C. 154(b) by 375 days.

(21) Appl. No.: 14/222,893

(22) Filed: Mar. 24, 2014

(65) Prior Publication Data
US 2015/0269737 A1    Sep. 24, 2015

(51) Int. Cl.
*H04N 13/00* (2006.01)
*G06T 15/00* (2011.01)

(52) U.S. Cl.
CPC ................... *H04N 13/0022* (2013.01)

(58) Field of Classification Search
None
See application file for complete search history.

(56) References Cited

U.S. PATENT DOCUMENTS

| 7,126,598 | B2 | 10/2006 | Oh et al. |
| 8,009,897 | B2 | 8/2011 | Xu et al. |
| 8,340,397 | B2 | 12/2012 | Jeon et al. |
| 8,384,763 | B2 | 2/2013 | Tam et al. |
| 2011/0026809 | A1 | 2/2011 | Jeong et al. |
| 2011/0285701 | A1* | 11/2011 | Chen .................... G06K 9/4638 345/419 |
| 2011/0298898 | A1* | 12/2011 | Jung .................. H04N 13/0239 348/47 |
| 2012/0113219 | A1 | 5/2012 | Chang et al. |
| 2012/0206442 | A1 | 8/2012 | Tian et al. |
| 2013/0136339 | A1 | 5/2013 | Moon et al. |

OTHER PUBLICATIONS

Stefano Mattoccia, "Stereo Vision: Algorithms and Applications", DEIS University of Bologna, May 11, 2012.
Scharstein & Szeliski, "A Taxonomy and Evaluation of Dense Two-Frame Stereo Correspondence Algorithms", International Journal of Computer Vision (IJCV), Apr. 2002, vol. 47, Issue 1-3, pp. 7-42.
Qingqing Wei, "Converting 2D to 3D: A Survey", Information and Communication Theory Group (ICT), Delft University of Technology, the Netherlands, Dec. 2005.

* cited by examiner

*Primary Examiner* — Hung Dang
(74) *Attorney, Agent, or Firm* — Stuart T. Auvinen; gPatent LLC

(57) ABSTRACT

Multi view images are generated with reduced flickering. A first depth map is generated from stereo images by stereo-matching. When stereo-matching is poor or varies too much from frame to frame, disparity fallback selects a second depth map that is generated from a single view without stereo-matching, preventing stereo-matching errors from producing visible artifacts or flickering. Flat or textureless regions can use the second depth map, while regions with good stereo-matching use the first depth map. Depth maps are generated with a one-frame delay and buffered. Low-cost temporal coherence reduces costs used for stereo-matching when the pixel location selected as the lowest-cost disparity is within a distance threshold of the same pixel in a last frame. Hybrid view synthesis uses forward mapping for smaller numbers of views, and backward mapping from the forward-mapping results for larger numbers of views. Rotated masks are generated on-the-fly for backward mapping.

20 Claims, 19 Drawing Sheets

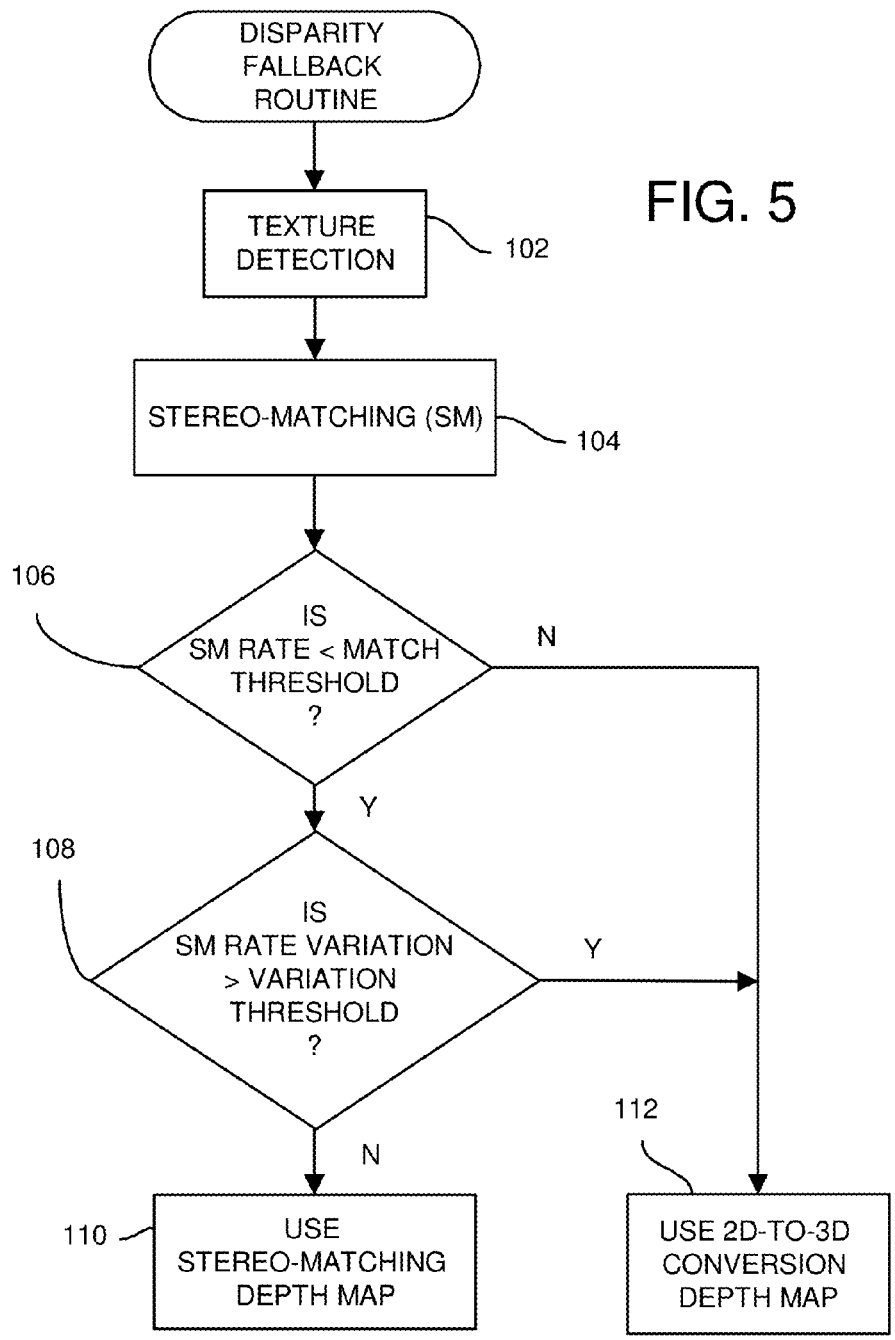

81% MATCH RATE (USE STEREO-MATCHING OUTPUT)

LEFT IMAGE    STEREO-MATCH OUT    MATCH RATE    SINGLE VIEW OUT

45% MATCH RATE (USE FALLBACK)

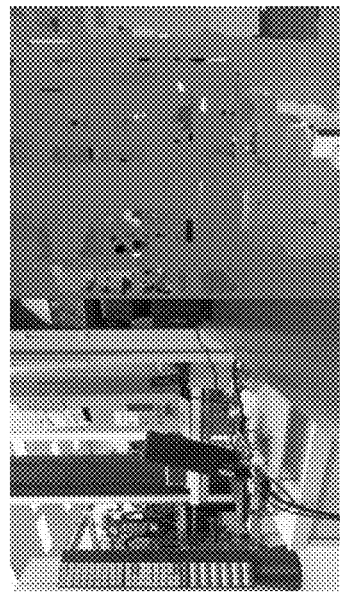
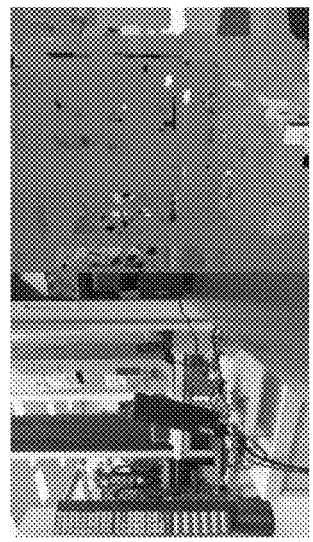
FIG. 8A — VISIBLE SPOTS DUE TO STEREO MISMATCHING
FIG. 8B — VISIBLE SPOTS WITHOUT TEMPORAL COHERENCE OPTIMIZATION

FEWER SPOTS WITH TEMPORAL COHERENCE OPTIMIZATION

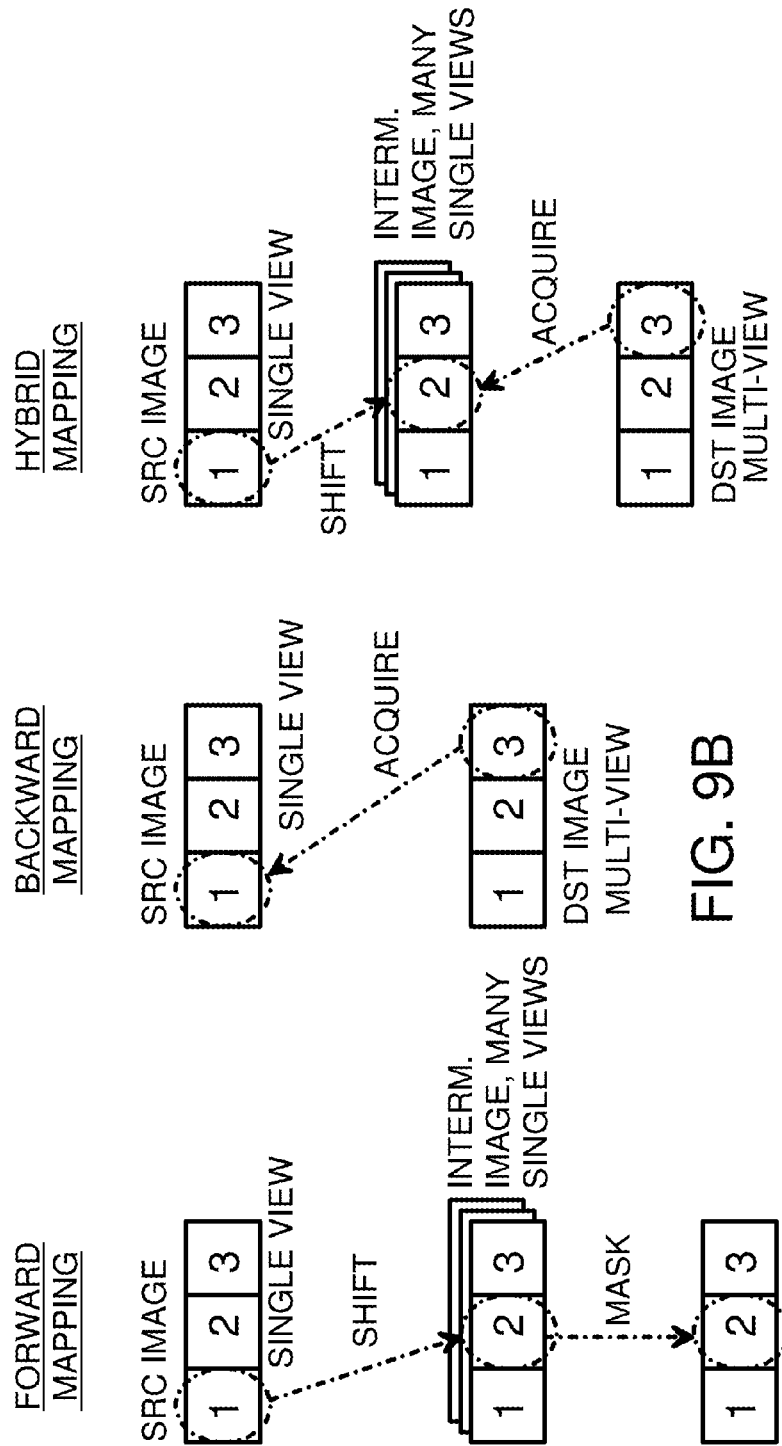

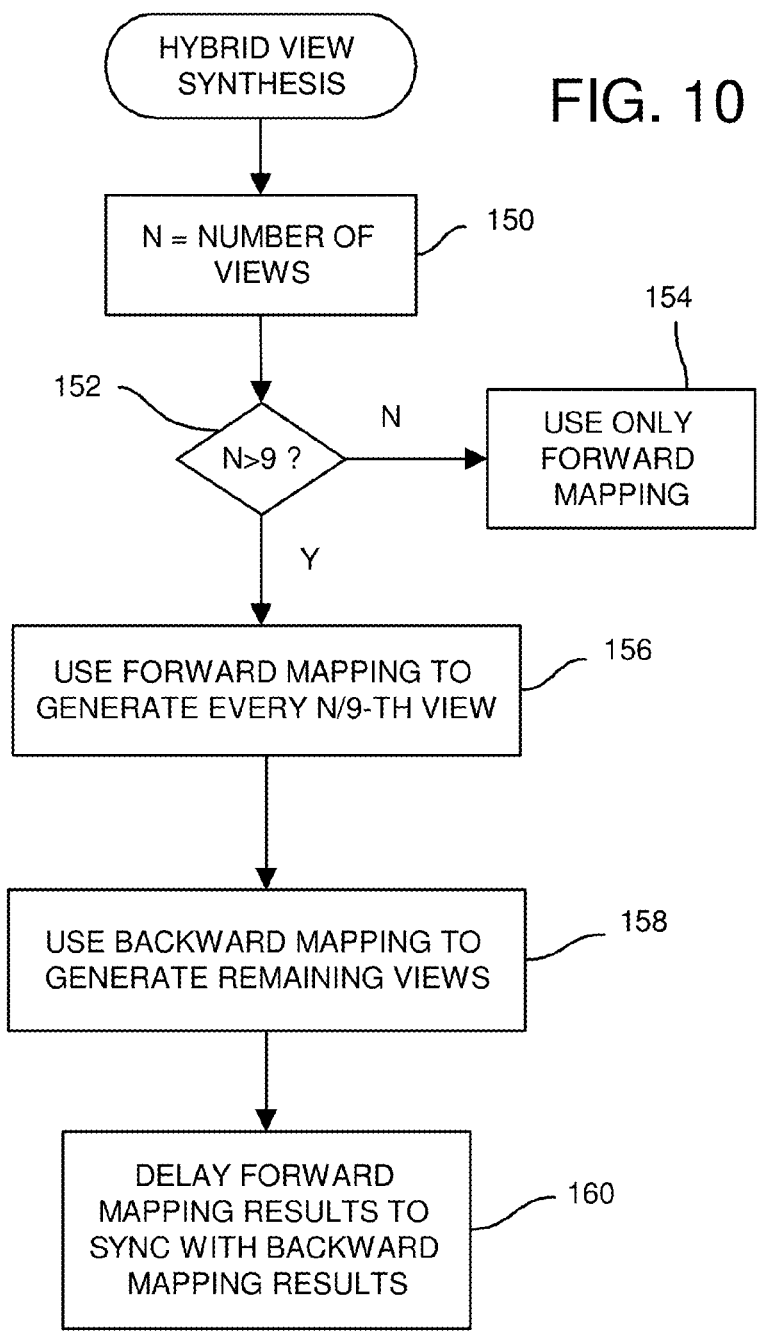

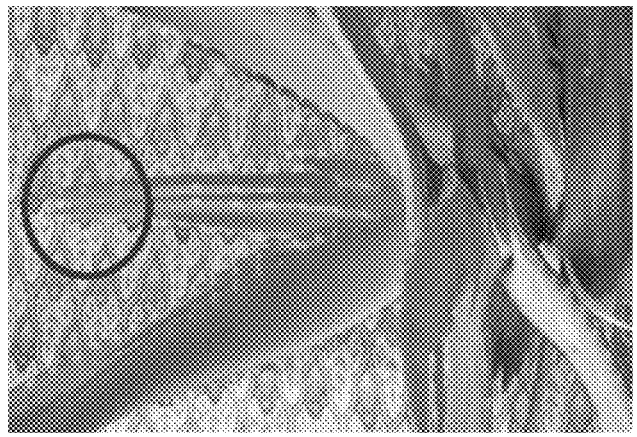
BACKWARD MAPPING
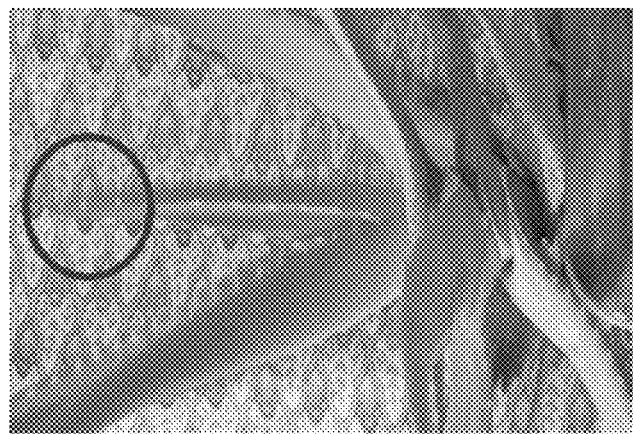
HYBRID MAPPING
FIG. 13
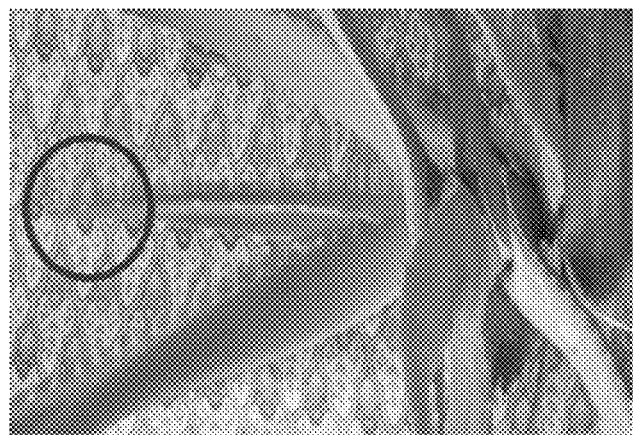
FORWARD MAPPING

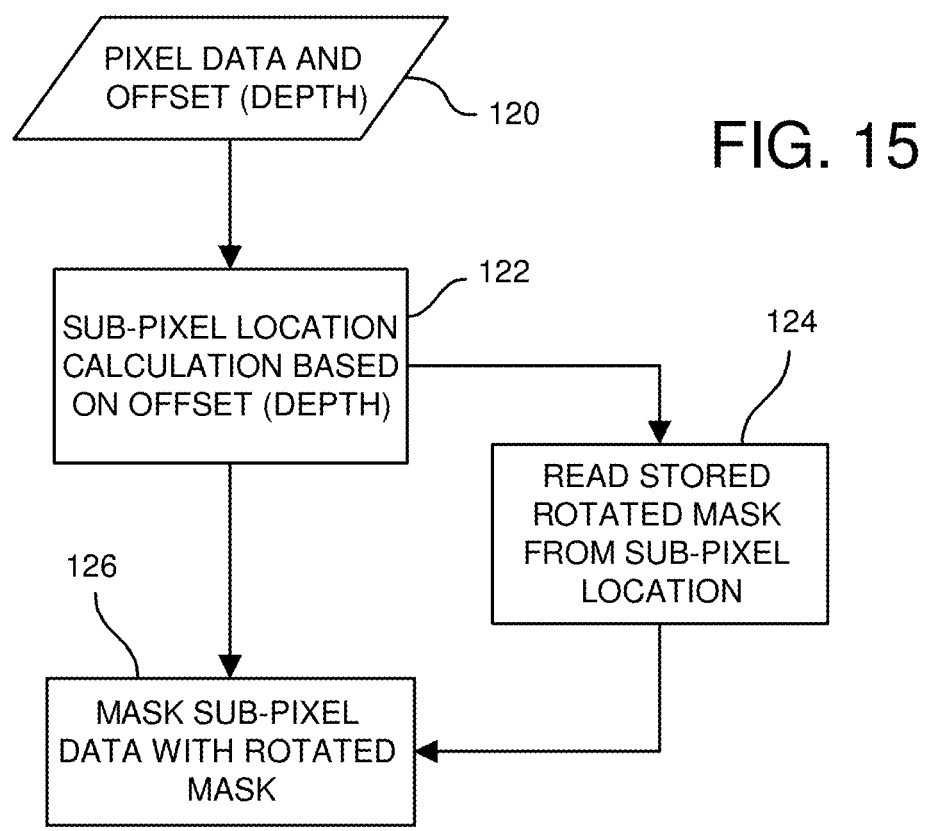

MULTI-VIEW SYNTHESIS IN REAL-TIME WITH FALLBACK TO 2D FROM 3D TO REDUCE FLICKER IN LOW OR UNSTABLE STEREO-MATCHING IMAGE REGIONS

FIELD OF THE INVENTION

This invention relates to 3D graphics systems, and more particularly to synthesis of multi-view images from single or stereo images.

BACKGROUND OF THE INVENTION

Depth or three-dimensional (3D) effects have been added to movies for many decades. Audience members wear special 3D glasses with a red filter for one eye, and a cyan filter for the other eye. The movie is simultaneously captured by two cameras, or altered to have two separate images. The two images are combined into a single image using color filters to create a different image for each eye. No special display equipment is needed but each eye will experience color loss in the image.

More recently, different polarizations are used rather than different colors for the two images. Polarized glasses rather than red/cyan glasses are worn.

Special liquid crystal display (LCD) glasses that alternately black out one eye and then the other eye may be used with special 3D TV's or displays. The LCD glasses are synchronized to the display, which alternates between 2 views. Side by Side and Top/Bottom formats may use active shutters or polarization.

Auto stereoscopic techniques do not use special 3D glasses. Instead, the display device is altered to project different images to the user's left and right eye. Viewers in different physical locations may have different perceptions.

Multi-view systems may display more views than two, such as 8 or 16 views per frame. For example, an array of sixteen cameras may simultaneously capture 16 video streams for display on a 16-view multi-view system.

Video captured by older stereoscopic cameras has only two view images per frame. Multi-view displays may have many more views, such as 8, 16, or 28. It is desired to generate or synthesize these multi views from the two views of a stereoscopic video, or from a single view image with a depth map of the image.

Older video does not have depth information or stereoscopic views. It is also desired to synthesize multi views from these single view legacy videos.

FIG. 1 shows a multi-view frame of 8 views being synthesized from a stereo-view frame of 2 views. A stereo view having 2 images per frame is the source or input. A depth map may be created from this stereo view. The depth map shows closer parts of the image as white, such as the man's hand, and objects in the background as black, such as the hallway behind the man's head. A multi-view image of 8 views is desired to be created from the generated depth map and the input stereo image.

Differences from one frame to the next frame in the video stream may cause the multi-view images to be unstable, resulting in visible flickering. Such flickering is distracting and undesirable.

Camera mismatch among the multiple cameras may yield poor matching results during video compression or other image processing. Camera calibration before video capture may not be precise. Texture within the image, or a lack of texture, may cause more mismatching. These problems may cause stray blocks or other artifacts to be visible to the viewers. Such image errors are undesirable.

Some applications require that the multi-view images be synthesized in real time, or with only a one-frame delay. Memory requirements should be reduced, especially for viewing on small portable devices. Thus storing only one or two frames is desirable.

Some newer multi-view displays may use masks to define each of the multiple views. These masks may be rotated. Such rotated masks may require too much processing power and memory for real time applications.

What is desired is a multi-view synthesizer that creates multi view images using only a one-frame delay. A multi-view generator with reduced visual artifacts in low-texture regions, and with reduced flickering, is also desired. A system that can handle rotated masks is also desired. It is desired to discard poor matching results to reduce artifacts and flickering.

BRIEF DESCRIPTION OF THE DRAWINGS

FIG. 5 is a flowchart of a disparity fallback routine.

FIGS. 8A-B show visible artifacts due to stereo-matching errors and frame-to-frame variation.

FIG. 10 is a flowchart of hybrid multi-view synthesis.

FIG. 13 compares views synthesized using forward, backward, and hybrid mapping.

FIGS. 14A-D show mask rotation.

FIG. 15 shows view synthesis with a stored rotated mask.

DETAILED DESCRIPTION

The present invention relates to an improvement in 3D graphics and multiview generation. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
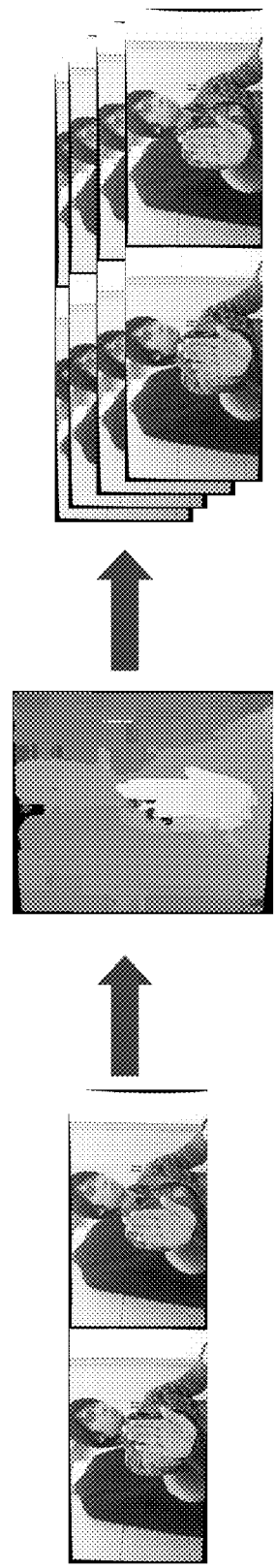
FIG. 1 shows a multi-view frame of 8 views being synthesized from a stereo-view frame of 2 views.
Figure 2:
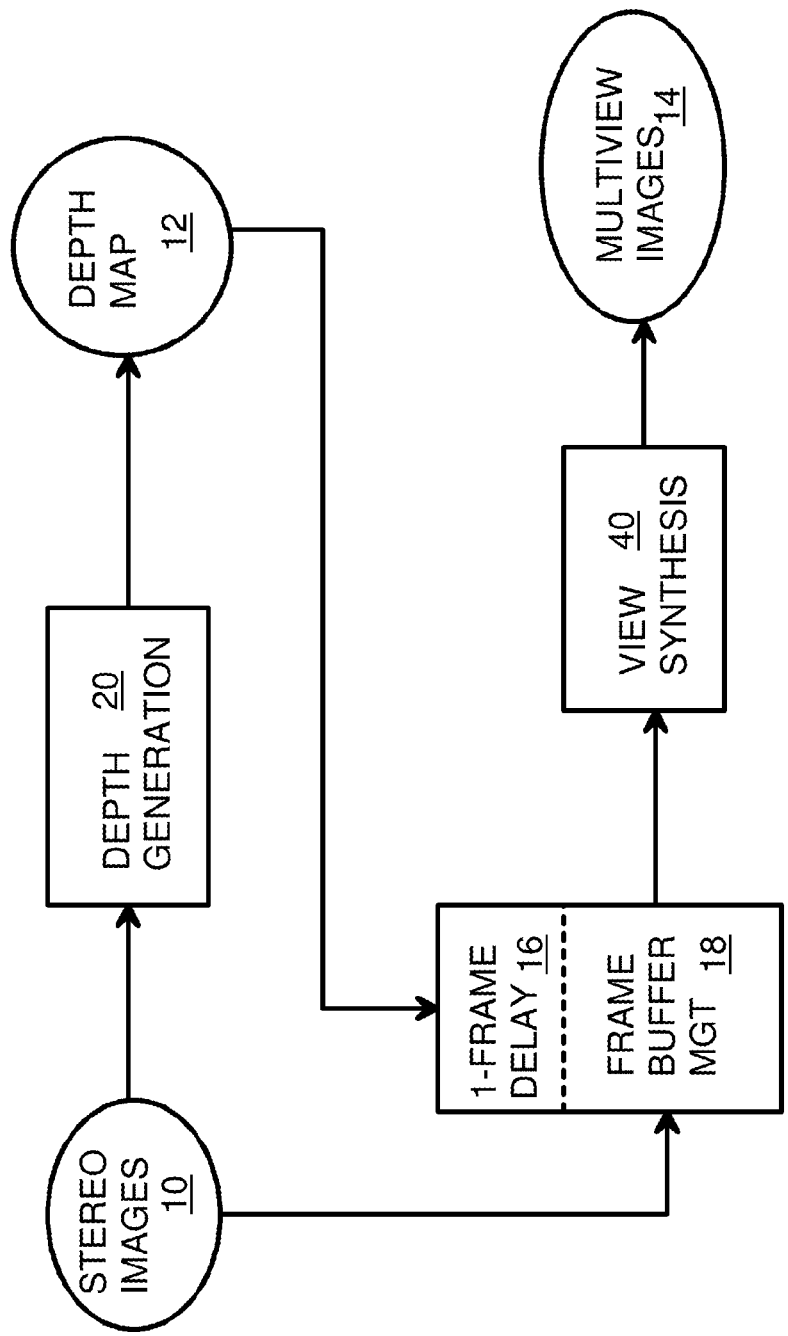
FIG. 2 is a simplified block diagram of a multi-view synthesizer.

FIG. 2 is a simplified block diagram of a multi-view synthesizer. Stereo images 10 have two views per frame, such as when taken by a stereoscopic camera. The depth of each pixel location is generated from the stereo images by depth generator 20. A variety of techniques may be used by depth generator 20 to generate depth map 12. Depth map 12 is generated from stereo images 10.

A depth map has depth or Z values for all pixels in an image. Disparity is the apparent movement of an object between stereo or multi-view images, such as between a left view and a right view. When the images are properly rectified to account for camera angles, this apparent movement is along a row or horizontal line (X direction). The apparent movement or displacement (ΔX) of the object from the left view to the right view along this horizontal line is referred to as the disparity.

Disparity can be measured as the number of pixels along this horizontal line that the object appears to move between the left and right views. Disparity is inversely proportional to the depth. Objects that are closer to the cameras appear to move greater distances than background objects. Once the disparity is generated from the stereo images, the depth Z can be calculated from the disparity X by triangulation using the distance between the two cameras, or baseline, and possibly the focal length.

In practice, the left and right stereo view images are the input for stereo-matching within depth generator 20. A stereo-matching routine attempts to identify the same pixel in both right and left views by searching in the right image along the horizontal line over a range of a few pixels around the left image's pixel's location. The right pixel in that range of the horizontal line that most closely matches the left pixel is chosen as the matching pixel. The distance between the left and right pixel locations is the disparity for that left pixel.

Disparity is generated for all pixels in the left image to form a disparity map. Disparity is the number of pixels of apparent movement or displacement between the left and right views. Disparity is inversely proportional to the depth. If the disparity is known from stereo images, the depth can be calculated by triangulation using the distance between the two cameras, or baseline, and the focal depth. Once the disparity map is generated, a depth map may be generated.

Depth map 12 is delayed by one frame time period by frame delay buffer 16 in frame buffer manager 18. View synthesizer 40 receives a delayed depth map 12 and the current frame of stereo images 10 from frame buffer manager 18. A single view image is generated from the current frame of stereo images 10. Since frames usually don't change significantly from frame to frame unless there is a scene change, the pairing of the current frame of a single view image with the depth map of the prior frame is not noticeable to human eyes for video, unless there is a scene change. Ideally, if memory storage is not an issue, the prior single view image may be stored and matched to the depth map of the prior frame.

View synthesizer 40 generates multi-view images 14 by selecting or combining pixels from the current frame and depth information from the prior frame. When stereo-correspondence or stereo-matching is good, a depth map generated from the two stereo images is used, but when stereo-matching is poor, the depth map generated from the single view image is used as a fallback to reduce visible errors that result from poor stereo-matching.

Figure 3:
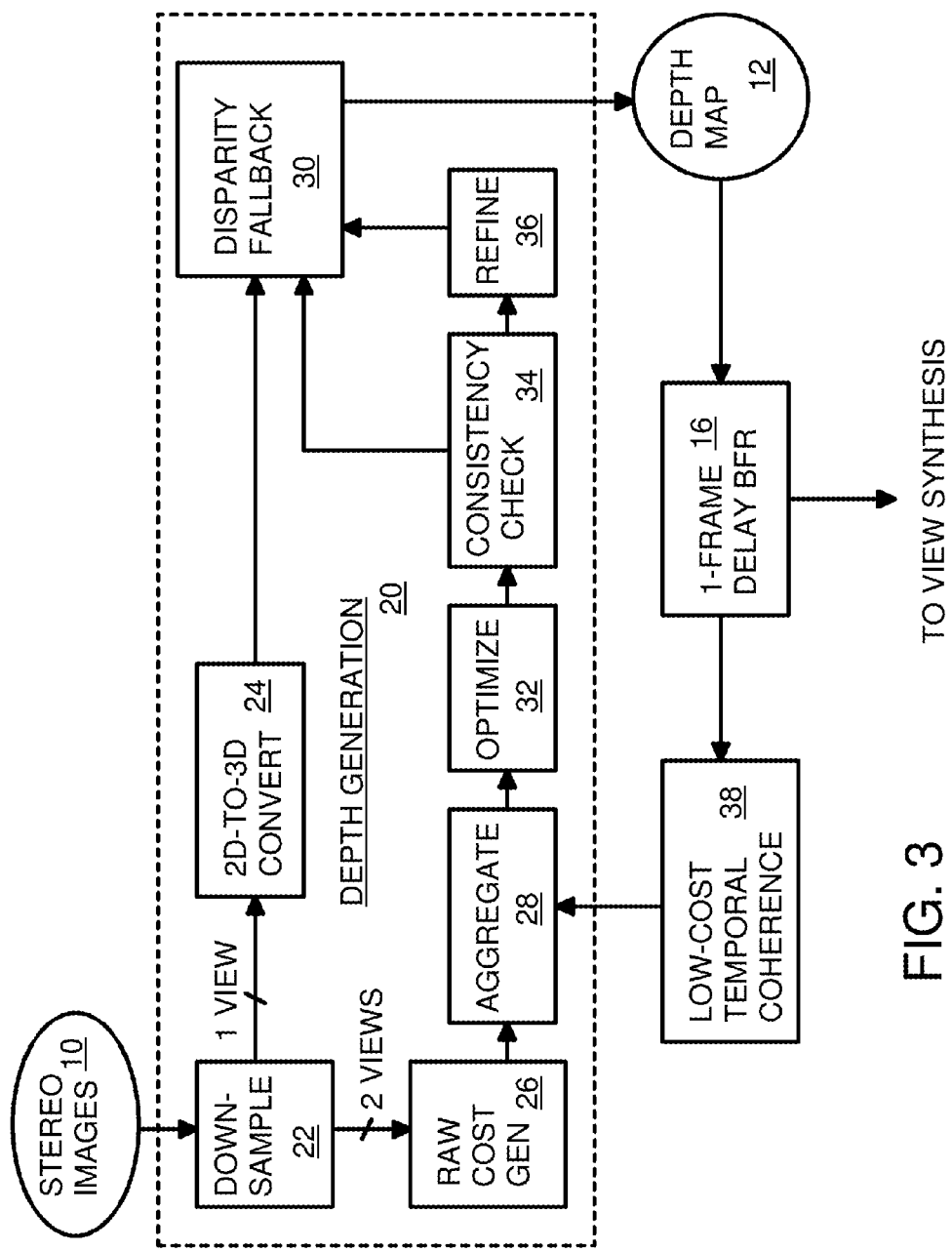
FIG. 3 shows the depth map generation in more detail.

FIG. 3 shows the depth map generation in more detail. Depth generator 20 receives stereo images 10 for the prior frame and generates depth map 12, which is delayed by frame delay buffer 16 for use with the current frame by view synthesizer 40 (shown in more detail in FIG. 4).

Two depth maps are generated. A first depth map is constructed from only one view image, while a second depth map is constructed from two stereo images. The first depth map constructed from only one view image is not susceptible to stereo-matching errors since stereo images are not used, so it is useful as a fallback when stereo-matching errors occur and the second depth map is unreliable. The first depth map is generated by 2D-to-3D converter 24 from a single view image. The second depth map is generated by cost generator 26 and other blocks from two stereo images.

While a disparity map or a depth map may be constructed for each individual pixel, computations are reduced if disparity searching is performed for blocks of pixels rather than for each individual pixel. Alternatively, the original images may be down-sampled to a lower resolution so that each lower-resolution pixel is an average of several higher resolution pixels. Stereo images 10 are down sampled by downsampler 22 to produce lower-resolution stereo images. Using down-sampled images also helps to filter out stray pixels.

The left stereo image is selected as an input to 2D-to-3D converter 24. 2D-to-3D converter 24 does not receive a stereo input but only receives a single-view input. 2D-to-3D converter 24 uses non-stereo techniques to estimate depths and generate a depth map. These non-stereo techniques may use various cues, such as increased blurring of more distant objects, haze over background objects, shading, linear perspective and vanishing perspective lines, defocus using second Gaussian derivatives, etc.

The depth map produced by 2D-to-3D converter 24 is not sensitive to stereo-matching problems, since it is not created from stereo images. The depth map is created from a single image. Thus this depth map generated by 2D-to-3D converter 24 is useful as a fallback that is selected by disparity fallback 30 when stereo-matching is poor or unstable.

The two down-sampled stereo images from downsampler 22 are sent to cost generator 26. Cost generator 26 generates a cost for a range of disparity, for each pixel in the image. A high cost occurs when the disparity is high and the two stereo pixels are very different from each other. A low cost occurs when the pixels are a close match, indicating that the points are likely from the same physical location. The cost function could be based on an absolute value of a pixel color or luminance difference for a single right and a single left pixel, or could be calculated with the Hamming distance between a pixel and its neighboring pixels.

Aggregator 28 sums cost for multiple pixels, such as within a 3 by 3 window or irregular patches based on similar characteristic such as luminance. The aggregator helps create smoother depth maps by considering multiple pixels as units for optimization to offset problems with stray pixels. This is usually a reasonable step since most objects are larger than a pixel. Optimizer 32 selects the right view pixel within the disparity range with the lowest cost. The disparity is the difference in the left pixel location that acts as the center of the pixel range, and the right pixel location having the lowest cost. A depth map is generated from the disparities by a direct lookup triangulation function.

Consistency checker 34 compares results of a mirror of the stereo-matching process. Cost generator 26 and aggregator 28 generate raw costs and aggregated costs that can be used both for a Left-to-Right (LR) stereo-matching process that uses a left pixel as the reference point, and for a Right-to-Left (RL) stereo-matching process that uses a right pixel as the reference point. Optimizer 32 can generate both a LR disparity and a RL disparity. Ideally, the LR and RL disparities should be equal.

Consistency checker 34 compares the LR disparity to the RL disparity. When the difference is more than a consistency threshold, such as disparity difference that corresponds to more than 3 depth levels of difference between the LR and RL results, then the results for this pixel are not consistent. Consistency checker 34 accumulates the number of pixels that have disparity differences less than the consistency threshold and generates a percentage of the pixels in a frame or region that are consistent. This percentage is known as the stereo-matching rate. The stereo-matching rate indicates a percentage of pixels that are consistent, such as 65% of the pixels in the image or region.

When the stereo-matching rate is less than a stereo-matching rate threshold, such as 70% of the pixels, then consistency checker 34 signals to disparity fallback 30 to discard the depth map produced from the stereo images by cost generator 26, aggregator 28, and optimizer 32. Disparity fallback 30 instead falls back to the depth map produced from a single-view image by 2D-to-3D converter 24.

Refiner 36 removes artifacts from the depth map by using filters such as a median or a mode filter. Refiner 36 is effective in removing single-pixel errors caused by the stereo-matching process.

Consistency checker 34 compares the stereo-matching rate of the previous frame to that for the frame currently being processed by depth generator 20. When the stereo-matching rate changes from one frame to the next by more than a stereo-matching rate variation threshold, the stereo-matching is unstable. Consistency checker 34 signals disparity fallback 30 to fall back and use the more stable depth map produced from a single-view image by 2D-to-3D converter 24.

When the stereo-matching is good and stable from frame-to-frame, disparity fallback 30 uses the disparities generated by cost generator 26, aggregator 28, and optimizer 32 using stereo-matching of the two stereo images to generate a depth map. Stereo-matching tends to produce more accurate depth calculations than does 2D-to-3D converter 24 since two stereo view images are input rather than a single view image. However, when stereo-matching is unstable, such as in texture-less or flat regions, disparity fallback 30 can fallback to less accurate but more stable depth map produced by 2D-to-3D converter 24.

Ideally, several regions or areas in the image may be defined, such as when pre-defined areas or windows exist in the frame, or by edge detection or various segmentation techniques. Consistency checker 34 may then calculate the stereo-matching rate for the current region or area of the image, not for the whole image. The area's stereo-matching rate is compared to the stereo-matching rate threshold, and the stereo-matching rate variation threshold is compared to the difference in stereo-matching rates for the current area in the current and prior frames. Then based on the threshold comparisons for just the current area, consistency checker 34 causes disparity fallback 30 to select depth or disparity values from either 2D-to-3D converter 24 (when thresholds are exceeded) or from optimizer 32 for the area rather than for the whole frame. Some areas that exceed thresholds will fallback to the depth map from 2D-to-3D converter 24, such as flat or texture-less regions with poor stereo-matching, while other regions will use the more accurate stereo-matching depth map from optimizer 32.

Disparity fallback 30 selects the depth map produced from the stereo images when stereo-matching is good, but falls back to use the depth map produced from a single-view image by 2D-to-3D converter 24 when stereo-matching is poor. Depth map 12 contains the depth map generated from either the two stereo-view images when the stereo-matching rate is above the rate threshold and the variation is below the variation threshold, or the depth map is generated from a single-view image when stereo-matching within a frame is below the threshold, or when the stereo-matching rate varies by more than an acceptable threshold.

A disparity map showing displacements of objects between the two stereo images may be generated first. The disparity for the pixel location with the lowest cost function may be assigned to all pixels in the region. Then a depth map may be generated from the disparity map using triangulation with the focal length and baseline to obtain the depth or Z values. A lookup table with pre-determined values may be used for the triangulation function to convert from disparity to depth.

Coherence between frames is provided by low-cost temporal coherence 38. Low-cost temporal coherence 38 receives depth map 12 delayed by frame delay buffer 16. The depth data indicates locations of the lowest-cost pixels for the prior frame, and may be used for synchronization of the image data and its associated depth map for the previous frame. Hardware is reduced since the depth map from one frame is re-used for coherence with the next frame, eliminating the storage that would be needed if a separate depth map were stored for view synthesis and temporal coherence.

Small difference from one frame to the next in the video sequence can cause large changes in stereo-matching. Such abrupt changes in stereo-matching can create flickering in the output multi-view images. Low-cost temporal coherence 38 reduces such flickering by causing aggregator 28 to reduce the costs generated by cost generator 26 by a bias factor when a condition is met. The condition is that the lowest-cost pixel location has not shifted by a large amount. Thus when the pixel location selected by optimizer 32 is nearly the same location in both the prior and current frames, the cost is lowered further by the bias factor. This conditional lowering of costs when little frame-to-frame movement occurs rewards stability.

The condition that causes reduction of the cost for a pixel is when the location of the lowest cost pixel for a range moves by less than a distance threshold from the prior frame to the current frame. When the location in the first frame is less than the distance threshold from the location in the second frame, the condition is met and the cost function is reduced. For example, the distance threshold could be 4 pixels and the bias factor could be 0.5, so that when the location of the lowest pixel cost is less than 4 pixels away in the earlier frame, the cost is reduced by half. Thus costs are lowered when the location of the cost minimum in one frame is close to the location of the cost minimum in the other frame.

Figure 4:
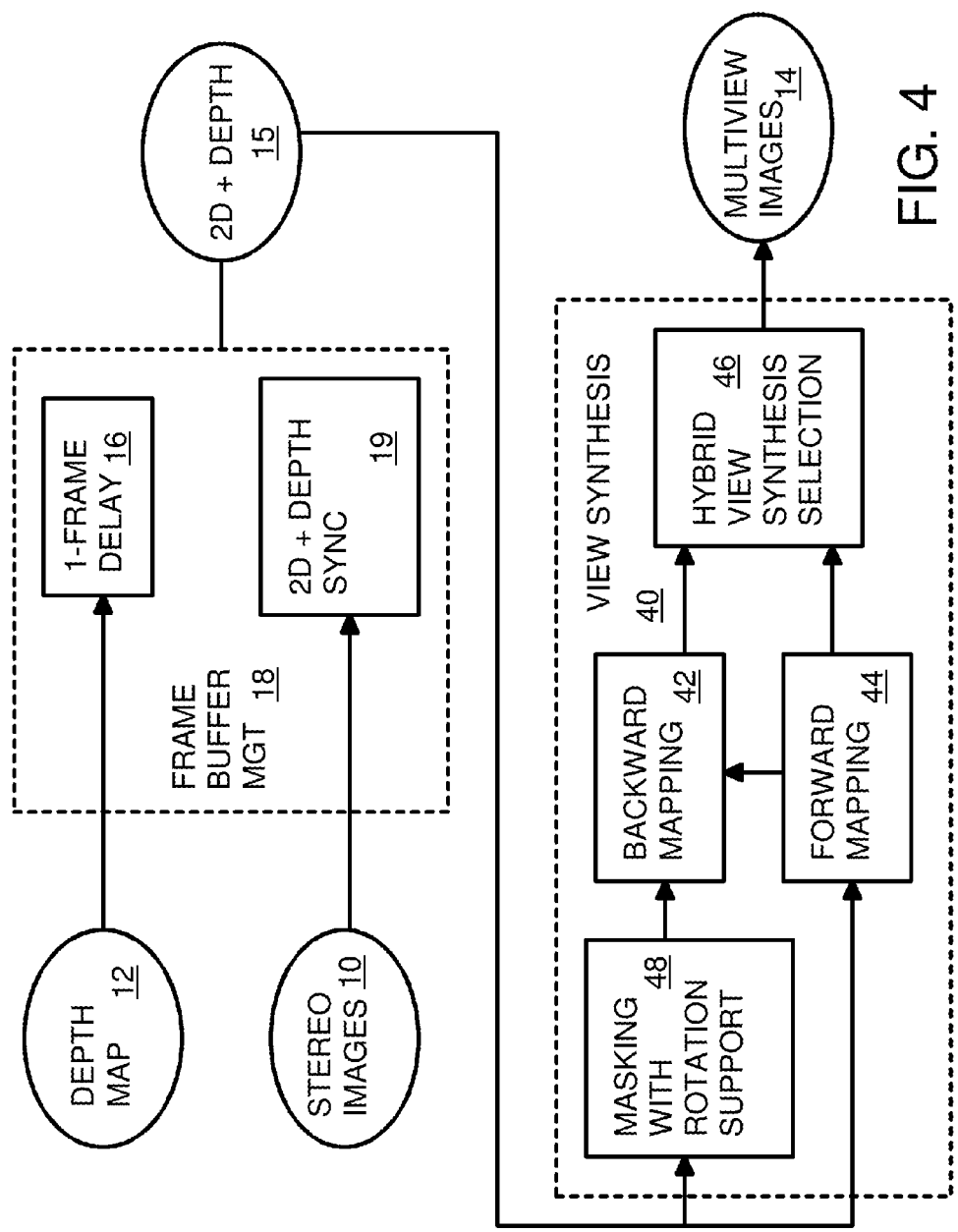
FIG. 4 shows the view synthesizer in more detail.

FIG. 4 shows the view synthesizer in more detail. Depth map 12 is stored by frame delay buffer 16 and delayed by one frame. This delayed depth map for the prior frame is combined with one of the two stereo images 10 for the current frame by depth synchronizer 19 to form an intermediate image that has the image for the current frame, but the depth map for the prior frame. Depth synchronizer 19 synchronizes the beginning of the current frame's images with the beginning of the depth map of the prior frame. Using the depth map for the prior frame allows for more time to generate the depth map since depth generation is performed on the prior frame. The image from the prior frame is not needed for view synthesis, only the depth map.

Frame buffer manager 18 provides the depth map for the prior frame and one of the stereo images 10 for the current frame to view synthesizer 40 as 2D+Depth information 15.

View synthesizer 40 generates multi views from the depth maps and single or stereo images. Backward mapping from the prior frame's single view to the current frame's stereo views is performed by backward mapper 42. Forward mapping from the current frame's stereo views to the prior frame's single view is performed by forward mapper 44.

When the number of multi views per frame is small, such as 9 or less, then only forward mapping is used. Hybrid view synthesis selector 46 selects only forward mapping results from forward mapper 44.

When the number of multi views per frame is larger, such as more than 9, then both forward mapping and backward mapping is used. Hybrid view synthesis selector 46 selects both forward mapping results from forward mapper 44 and backward mapping results from backward mapper 42.

Masks may be used to generate the multiple views from the view synthesized by hybrid view synthesis selector 46. Forward mapper 44 takes stereo images 10 and shifts each sub-pixel by an offset generated from the depth map from frame delay buffer 16. The offset may be generated by scaling the disparity. The offset is multiplied by a scaling factor for each of the multiple views being generated, such as −4 for view 0, −3 for view 1, −2 for view 2, 1 for view 3, 0 for view 4, +1 for view 5, +2 for view 6, and +3 for view 7. Sub-pixels for each view are then shifted by the scaled offset for that view. Shifting sub-pixels may leave holes, or location with no sub-pixels, so a hole-filling routine may be executed for each view image. The result is several view images, such as 8 view images.

A different mask is applied to each of the view images to generate multiple masked view images. Finally, the multiple masked view images are summed together to produce a multi-view image.

Backward mapper 42 reconstructs the final image one sub-pixel at a time. For each output pixel location, masks are applied to determine which of the multi views generates the sub-pixel for that output pixel location. Thus a single view is selected. The offset is different for each of the multi views. The offset for the view selected by the mask is used to find the original location of the sub-pixel in stereo images 10 or in a single input image. The sub-pixel located in stereo images 10 is then copied to the output pixel location. This process is then repeated for all pixels in the line, and for all lines in the output image.

Masker 48 provides masks for each of the multi views. The masks may be rotated in some embodiments and then applied to backward mapper 42. The generated multi view images are output as multi-view images 14.

FIG. 5 is a flowchart of a disparity fallback routine. This routine may implement disparity fallback 30 by executing on hardware logic gates, a graphics processor, a general-purpose processor, or other engines. Regions or areas in the image having little or no texture are detected by texture detection 102. Each region or area may then be processed separately by following steps 104-112 for that region or area. Flat regions with very little variation between pixels may jump to step 112 from step 104. These flat regions may be assigned to use the depth map generated from the single view image by 2D-to-3D converter 24, step 112.

Stereo-matching 104 is evaluated for each pixel, or for patches of pixels. In the LR process, a pixel from the left stereo image may be compared to a range of pixels in the right stereo image along a horizontal line around the same pixel location to find a best match. The best match may have the lowest SAD, SSD, or other function. Disparity may be generated for each pixel or patch from the stereo images and the depth generated from the focal point and baseline by triangulation. The process is repeated using a pixel from the right stereo image that is compared to a range of pixels from the left stereo image (RL process). When the results from the LR process and the RL process are within the consistency threshold, the pixel's stereo-matching is consistent. Results for all pixels in the frame or regions are aggregated to obtain a percentage of consistent results, or a stereo-matching rate.

When the stereo-matching rate is less than the match threshold, step 106, then stereo-matching is poor overall in that region. The depth map generated from the single view image by 2D-to-3D converter 24 is used for that region, step 112, as a fall back.

When the stereo-matching rate is more than the match threshold for that region, step 106, but the variation of the stereo-matching rate between the current frame and the prior frame is more than a variation threshold, step 108, then the depth map generated from the single view image by 2D-to-3D converter 24 is used for this region, step 112, as a fall back. This prevents flickering due to stereo-matching errors since the depth map is generated from a single view, not from the stereo views.

When the stereo-matching rate is more than the match threshold in this region, step 106, and the variation of the stereo-matching rate between the current frame and the prior frame is less than the variation threshold, step 108, then the stereo-matching is good in this region. The depth map generated from the stereo view image by cost generator 26, aggregator 28, and other blocks is used for this region, step 110.

For example, the match threshold may be 65% and the variation threshold 10%. Then when at least 65% of the pixels match in the region the stereo-matching is considered good and may be used for generating the multi view images. When stereo-matching is below 65%, then the 2D fallback is used for this region. When this region in the prior frame has a 70% match rate and in the current frame has an 82% match rate, then the match variation is too large, and the 2D fallback is used for this region rather than the stereo-matching results.

Figure 6A:
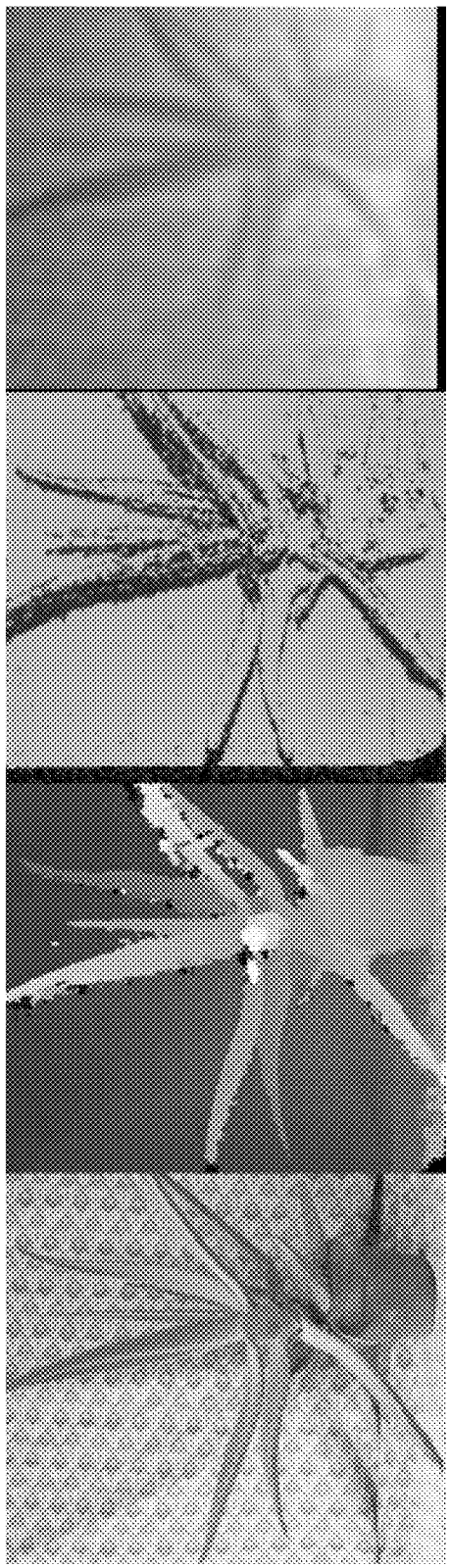
FIGS. 6A-B highlight visual results using disparity fallback.
Figure 6B:
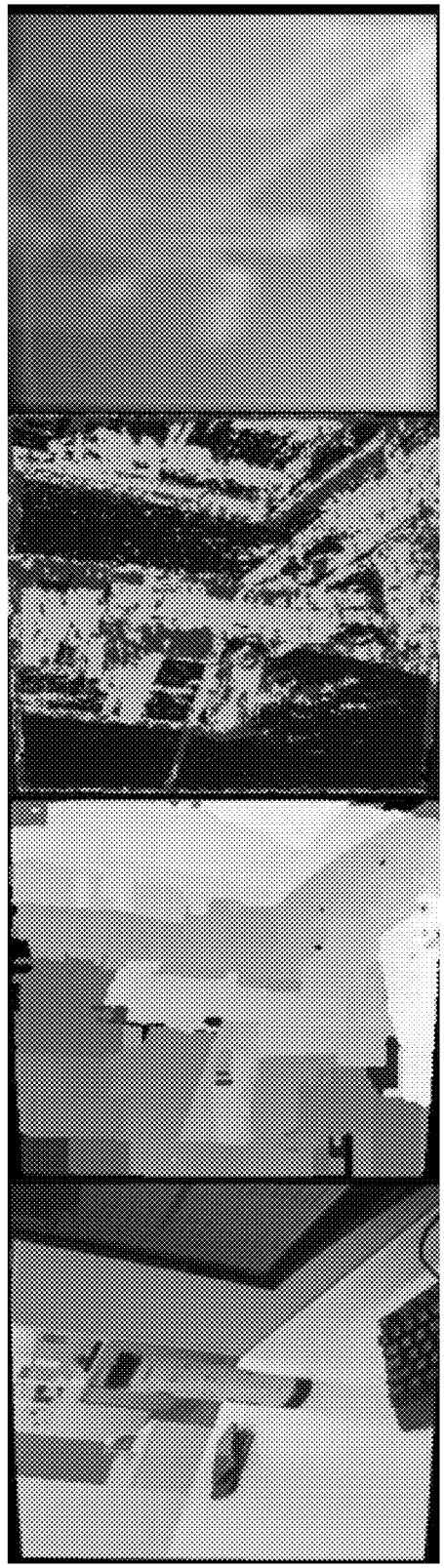

FIGS. 6A-B highlight visual results using disparity fallback. In FIG. 6A, the input is the "Left Image", which is the left stereo image that is input to depth generator 20, and may also be the input to 2D-to-3D converter 24.

2D-to-3D converter 24 generates the "Single-View Out" depth map on the far right of FIG. 6A. Since this depth map is generated from a single image, not from stereo images, it is not sensitive to stereo-matching errors.

Cost generator 26, aggregator 28, optimizer 32, and consistency checker 34 produce the "Stereo-Match Out" image from the two stereo images. Dark areas have a smaller depth than light areas. Thus stereo-matching correctly identifies the bed sheet in the background as having a small depth, and the Aloe plant and its pot as having higher depths (closer to the viewer). The arm of the Aloe plant that is pointed directly toward the viewer in the center of the plant has the largest depth and appears bright white.

The "Match Rate" image is the stereo-matching rate produced by consistency checker 34 for small regions in the image. Dark areas have a poor stereo match rate, such as the edges of the Aloe plant. Light areas have good stereo-matching, such as the bed sheet in the background. The pattern on the bed sheet acts as texture to help the stereo-matching routines to correctly match left and right view pixels.

The overall stereo-matching rate is 81%, which is above the match threshold of 65%, so the depth map generated by stereo-matching is selected by disparity fallback 30.

In FIG. 6B, the "Match Rate" image has much more dark areas than in FIG. 6A. The stereo-matching rate is much lower overall, at 45%. Since 45% is below the match threshold of 65%, the stereo-matching depth map is discarded. Disparity fallback 30 selects the depth map generated by 2D-to-3D converter 24 as a fallback. The depth map generated by 2D-to- 3D converter 24 does not use stereo images or stereo techniques, so is not sensitive to stereo errors.

The "Stereo-Match Out" image shows several stereo-matching errors. There are several dark black areas on the surface of the table near the coffee mug and the diskettes. These dark areas represent large depths, but they are not really in the background, since they are on the table closer to the foreground. Also, there are darker areas in the lower left, which should be lighter (foreground) areas. Thus the stereo-matching results are poor.

The top of the table is a flat or textureless area, and the lack of texture hinders stereo-matching. In contrast, the pattern on the bed sheet of FIG. 6A added texture and improved stereo-matching.

Figure 7:
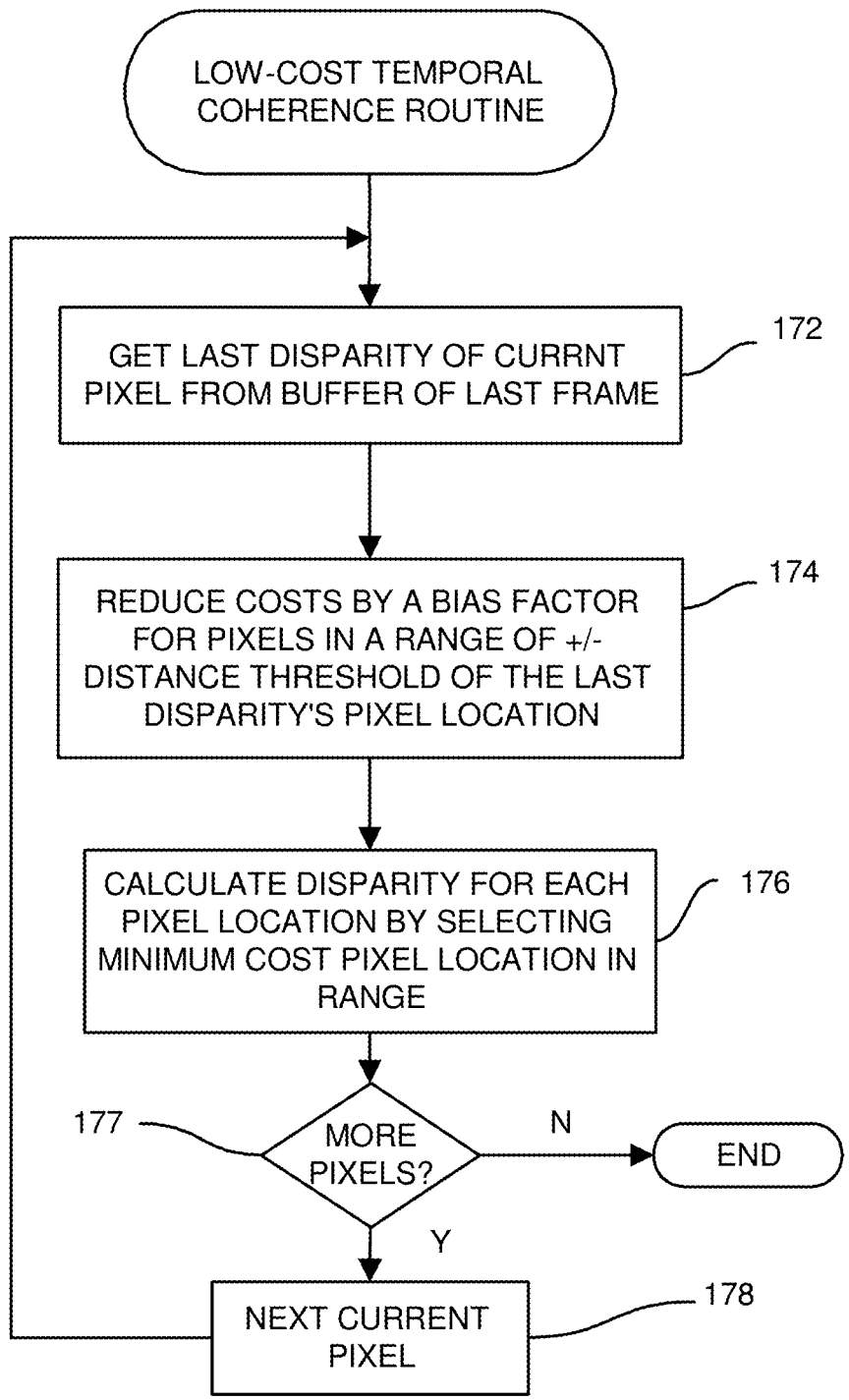
FIG. 7 is a flowchart of a low-cost temporal coherence routine.

FIG. 7 is a flowchart of a low-cost temporal coherence routine. This routine when executed by a processor or hardware gates may implement low-cost temporal coherence 38. Adjusted costs may be used by aggregator 28, optimizer 32, and consistency checker 34 in depth generator 20 to generate a better depth map that may be selected by disparity fallback 30.

The disparities for the last frame are obtained from frame delay buffer 16, step 172. These disparities were generated from 2D-to-3D converter 24 or from cost generator 26 and aggregator 28, depending on which source was selected by disparity fallback 30 for each region in the image. The winning (with lowest cost) disparity for the current pixel location is selected. Alternately, a running average of depths from several prior frames may be substituted for optimization.

The costs generated by cost generator 26 are conditionally adjusted, step 174. When the right view's pixel location being tested for a match with the left view's current pixel location is within a distance threshold of the last frame's disparity (right-view's pixel location), then the cost is multiplied by a bias factor. When the bias factor is less than one, the cost is reduced when the pixel location being tested is close to the last disparity pixel location. Thus when the current frame's disparity is close to the last frame's disparity, the cost is reduced. This cost reduction improves coherence between frames because small changes to disparities are rewarded with reduced costs compared with larger changes to disparities. Pixel locations that would result in larger disparity changes are assigned greater costs and are thus less likely to be selected as the minimum cost pixel location that determines the current disparity.

The right-view pixel location within the range that has the lowest cost is selected as the minimum cost pixel location, step 176. The distance from the left-view pixel to this right-view pixel location is the disparity for the left-view pixel.

When more pixels remain in the left-view image, step 177, then the next pixel in the left-view image is selected, step 178, and the process repeated with this new pixel location with step 172.

The bias factor may be less than one so that the cost is lowered when the best match is a small distance away. Thus costs are adjusted by including the bias factor that biases the costs to lower values when the disparity has little change from frame to frame. The lower cost pixel locations are more likely to be selected as the disparity, thus large changes in disparity are discouraged, providing for more stable and error free image synthesis.

FIGS. 8A-B show visible artifacts due to stereo-matching errors and frame-to-frame variation. In FIG. 8A, the laboratory wall in the foreground has many dark and white spots and blocks. The lack of texture on the laboratory wall makes if difficult to match pixels in the left stereo image with the same pixels on the right stereo image. All the pixels on the laboratory wall look alike.

Figure 8C:
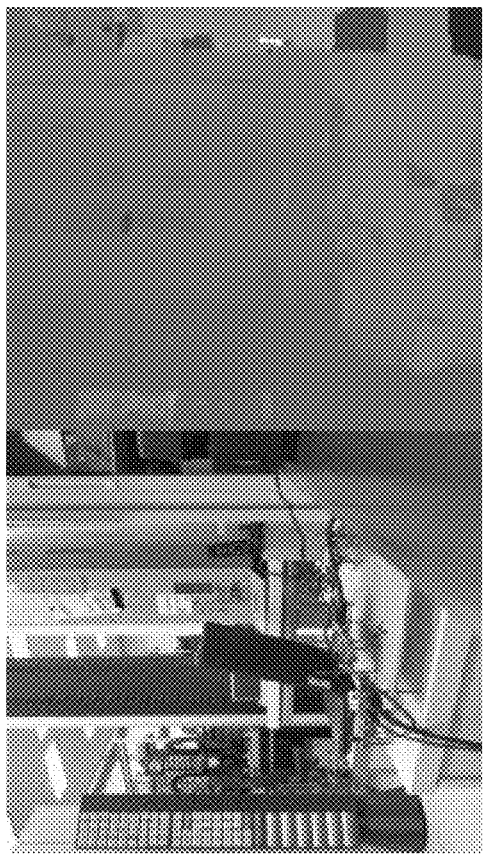
FIG. 8C shows the reduction in visible artifacts using low cost temporal coherence FIGS. 9A-C highlight forward, backward, and hybrid mapping to generate multi-view images.

FIG. 8A shows stereo-matching errors in a first frame. Neither disparity fallback 30 nor low-cost temporal coherence 38 is used. FIGS. 8B, 8C show a second frame. In FIG. 8B, low-cost temporal coherence 38 is not used. In FIG. 8C, low-cost temporal coherence 38 is used. As shown in FIG. 8B, the visible artifacts on the laboratory wall as still visible. The stereo-matching results are not stable from frame to frame. However, when low-cost temporal coherence 38 is also enabled, FIG. 8C shows that the visible spots and blocks on the flat laboratory wall are greatly diminished.

FIGS. 9A-C highlight forward, backward, and hybrid mapping to generate multi-view images. A depth map is available for the prior frame and stored in frame delay buffer 16. Stereo views are available for the current frame in frame buffer manager 18. One of stereo images 10 is selected as the source (SRC) image. The destination (DST) image is the multi view image 14 that is output.

FIG. 9A shows forward mapping. Pixels contain Red (R) Green (G), and Blue (B) components or sub-pixels. Sub-pixels from the source image are shifted by scaled disparities (offsets) to generate multiple views. Masks may be applied to these multiple views to generate the output multi view image, which is the destination image.

The first 3 sub-pixel locations in each image are shown as 1, 2, and 3 in FIGS. 9A-C. In FIG. 9A, the source sub-pixel in location 1 of the source single-view image is shifted by an offset of +1 into position 2 in the intermediate single-view image. A mask for this view is applied to create the destination multi-view image. Other sub-pixels are shifted and masked in the same manner to build the destination multi-view image. Different offsets for different views create the 3D effect. There may be multiple intermediate images, one for each view.

FIG. 9B shows backward mapping. In backward mapping, each sub-pixel location in the output or destination image is first scanned by filters or masks to determine which mask applies to this sub-pixel location. Knowing the correct mask, one of the multi views is identified, and the scaled disparity (offset) for this identified multi view is used to shift from the sub-pixel location in the output destination image to a sub-pixel location in the source input image. The sub-pixel is read from the source input image and placed in the output sub-pixel location. Thus backward mapping looks back from the destination image to the source image.

For example, the sub-pixel for sub-pixel location 3 of the destination or output multi-view image needs to be generated. A mask that passes sub-pixel location 3 has an offset of +2. The mask's offset is inverted and used to find the sub-pixel in the source single-view image (location 3−2=location 1). The source sub-pixel at location 1 of the source single-view image is copied to location 3 of the destination multi-view image. Other sub-pixels are acquired in the same manner to build the destination multi-view image.

FIG. 9C shows hybrid mapping. Hybrid mapping is used for larger numbers of views, such as more than 9. A two-stage process is used. In the first stage, forward mapping generates 9 intermediate views. In the second stage, backward mapping is used to generate the remaining views. Backward mapping may be performed using the intermediate views as the source images. Sub-pixels are selected and shifted from these intermediate views to generate the output views using backward mapping. The backward mapping views are combined with the forward mapping views to generate the final multi view image.

For example, the sub-pixel for sub-pixel location 3 of the destination or output multi-view image needs to be generated. Forward mapping generates several intermediate images by shifting and masking, as shown in FIG. 9A.

For backward mapping from the intermediate image to the final destination image, a mask that passes sub-pixel location 3 has an offset of +1. The mask's offset is inverted and used to find the sub-pixel in the intermediate image that was generated by forward mapping, (location 3−1=location 2). The source sub-pixel at location 2 of the intermediate image is copied to location 3 of the destination multi-view image. Other sub-pixels are acquired in the same manner to build the destination multi-view image.

FIG. 10 is a flowchart of hybrid multi-view synthesis. The routine of FIG. 10 may be implemented in hardware or on a processor to implement view synthesizer 40. The number of views N in the multi views is determined, step 150. For stereo views, N=2. When N is 9 or less, step 152, then only forward mapping is used to generate the multi views, step 154.

When N is more than 9, step 152, then forward mapping is used to generate every N/9-th view, step 156. The other views 1 to N−1, and multiples thereof, are generated by backward mapping, step 158. The forward mapping results are delayed by one frame for synchronizing with the backward mapping results, step 160.

Figure 11:
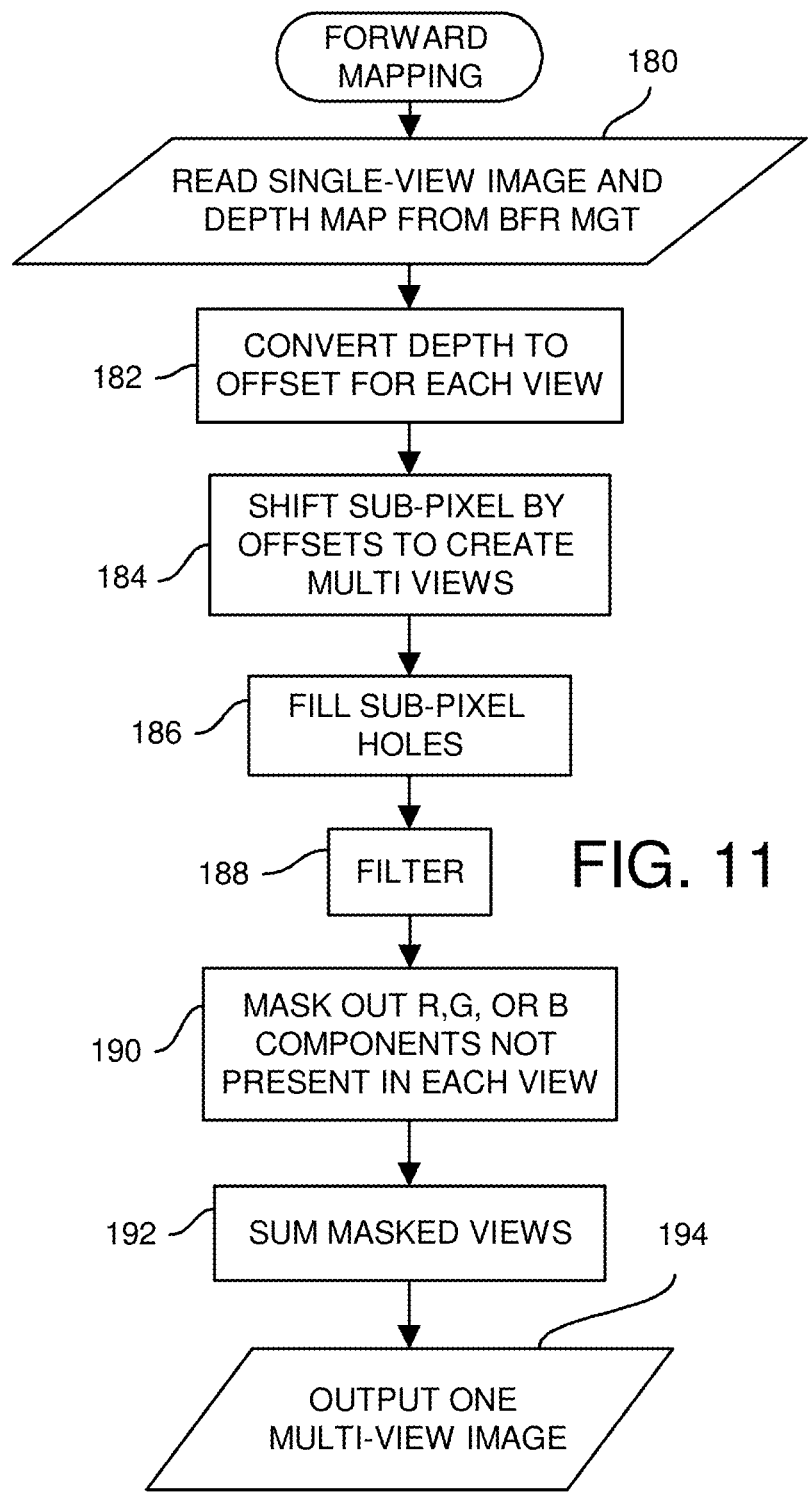
FIG. 11 is a flowchart of a forward mapping process to generate a multi-view image.

FIG. 11 is a flowchart of a forward mapping process to generate a multi-view image. The single-view image and depth map are read from frame buffer manager 18, step 180. The single-view image may be one of the stereo images for the current frame, such as the left view image. Depth values (Z) from the depth map are converted to offsets (X), step 182, such as by triangulation using a look-up table of pre-calculated values. Each view may have a different offset. Thus several offsets are calculated for each sub-pixel location, one offset for each view. Source sub-pixels from the single-view image are shifted by the offsets and copied into the multi-view images, step 184.

Shifting sub-pixels may create holes, or sub-pixel locations having no sub-pixel value. These holes are filled, step 186, using a hole-filling routine. For example, neighboring sub-pixels may be averaged to generate a sub-pixel value to fill each hole. Filter 188 is applied to each of the multi view images to improve the images and remove artifacts. A view masks are applied to each of the multi views, step 190. A view mask filters out or removes sub-pixels for colors that should not be present in that view. For example, output pixel #103 contains the Red (R) sub-pixel from view#1, the Green (G) sub-pixel from view#2, and the Blue (B) sub-pixel from view #3. When mask for view #3 is applied, only the B component for output pixel #103 is retained, while the R and G components (sub-pixels) are masked out.

The multiple views are then summed or combined, step 192, to generate a single multi-view image. This combined image is output as output multi-view image 194. The different colors in output multi-view image 194 come from different views and can be identified by the view masks.

Figure 12:
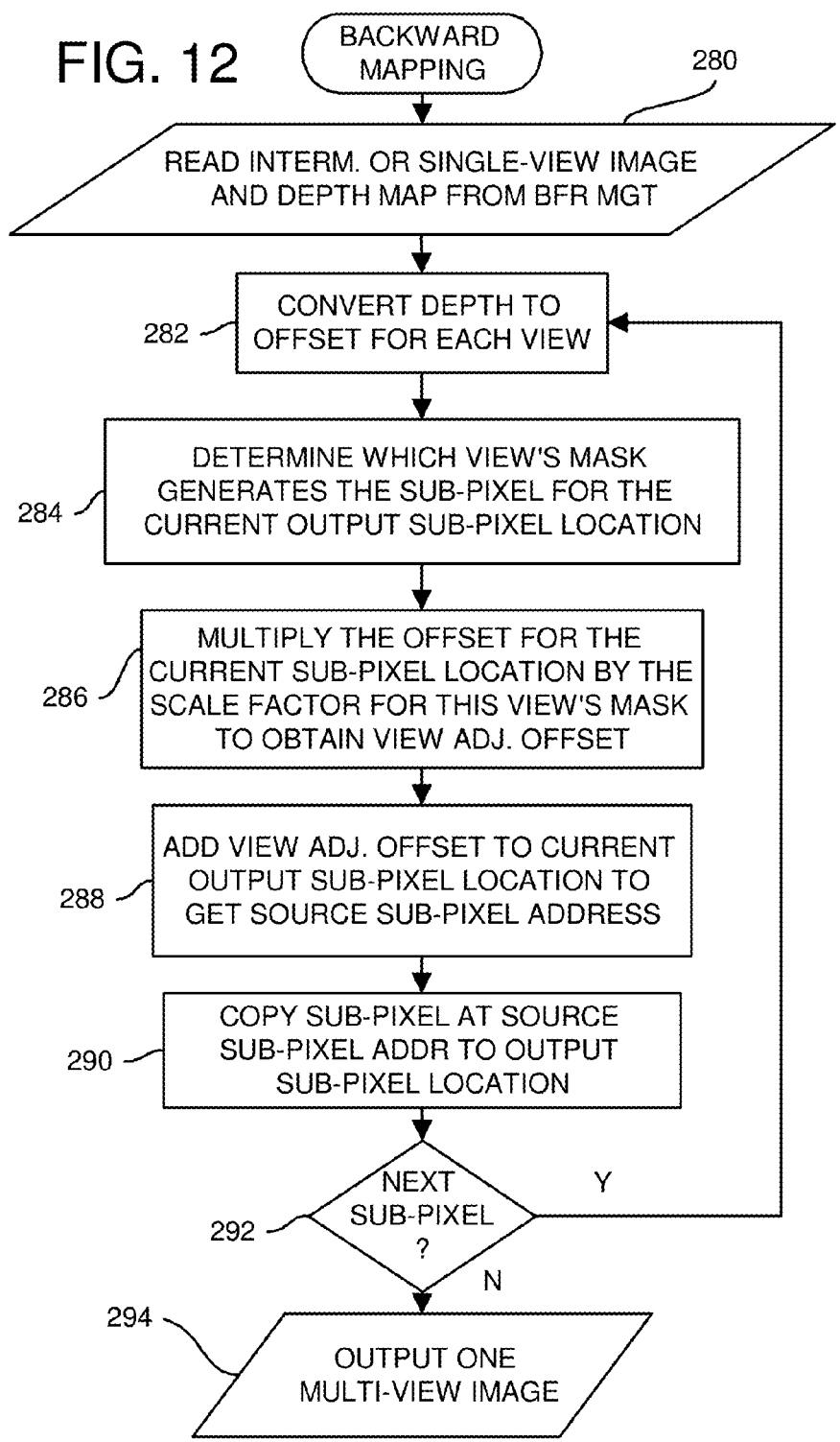
FIG. 12 is a flowchart of a backward mapping process to generate a multi-view image.

FIG. 12 is a flowchart of a backward mapping process to generate a multi-view image. The single-view image and depth map are read from frame buffer manager 18, step 280. Alternately, the forward mapping process of FIG. 11 produces intermediate images rather than output multi-view image 194.

Depth values (Z) from the depth map are converted to offsets (X), step 282, such as by triangulation using a look-up table of pre-calculated values. Each view may have a different offset. Thus several offsets are calculated for each sub-pixel location, one offset for each view.

Each sub-pixel location in final output multi-view image 294 is successively selected as the current output sub-pixel location for processing in backward mapping. It is determined which of the several view masks should generate the sub-pixel for the current output pixel location, step 284. For example, if the Red component of the current pixel has a Red mask from view 1, then only the R value from view 1 is used to generate this pixel. All R components of other views are masked out.

The offset generated in step 282 for the current output pixel location is multiplied by a scaling factor for the view mask identified in step 284. This multiplication generates the view-adjusted offset, step 286.

The view-adjusted offset is added to the current output sub-pixel location to get the source sub-pixel address, step 288. The source sub-pixel address is the location of the sub-pixel in the single-view or intermediate image read in step 280. The sub-pixel at the source address location in the single-view or intermediate image is copied to the output sub-pixel location, step 290.

This process is repeated for other sub-pixels in the output image, step 292, until all sub-pixels in output multi-view image 294 have been generated.

FIG. 13 compares views synthesized using forward, backward, and hybrid mapping. The Aloe plant is shown against a bed sheet background. As shown in the circled region, the tip of the Aloe plant has two ends and two central ribs in the backward mapping image. Backward mapping warps the image, producing errors that are not present in forward mapping. However, forward mapping is computationally expensive. Hybrid mapping uses both forward and backward mapping, but does not show the visible errors present in the backward mapped image.

Some multi-view displays may use masks that are rotated. Manufactures claim that rotated masks give better 3D effects, with less Moiré pattern distortions from a lenticular sheet. However, storage requirements may be large when the rotated masks are stored since rotated masks are not regular and repeating. Backward mapping may be particularly difficult when rotated masks are stored.

Figures 14A, 14B:
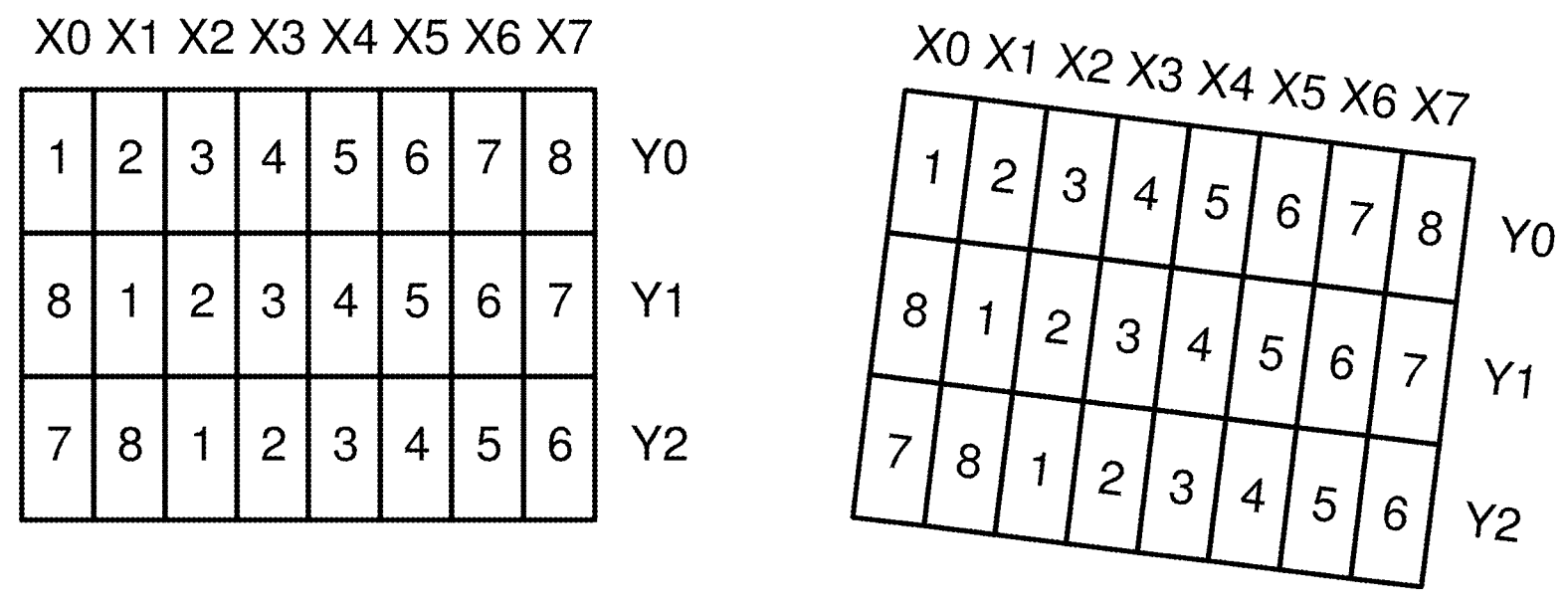
Figure 14D:
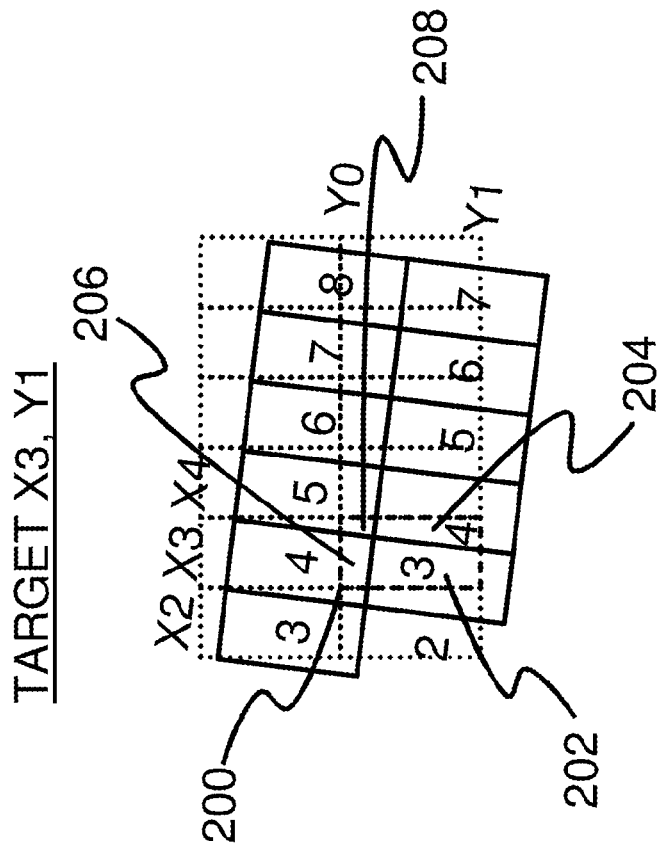

FIGS. 14A-D show mask rotation. FIG. 14A shows an original mask that is not rotated. Eight columns labeled X0, X1 ... X7 and three rows labeled Y0, Y1, Y2 are shown, but actual masks are much larger. Each cell can control masking of one sub-pixel in the image being masked. The numbers in the cells indicate which of the 8 views the cell's sub-pixel is for. For example, a mask that creates multi view #3 selects all sub-pixels in cell locations having "3", while sub-pixels are blocked for all other cell locations.

Each column may correspond to a single color sub-pixel. For example, columns X0, X3, X6 can be red sub-pixels, columns X1, X4, X7 can be green sub-pixels, and X2, X5 can be blue sub-pixels.

Figure 14C:
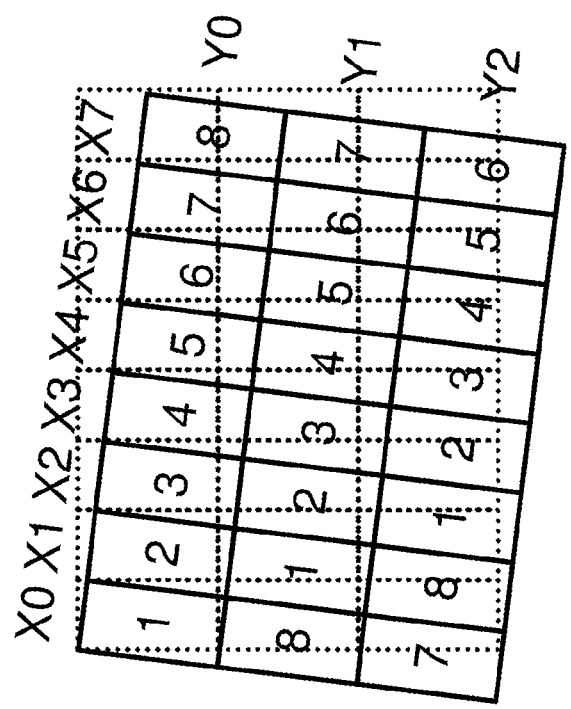

FIG. 14B shows a rotated mask. FIG. 14C shows the rotated mask superimposed over the original mask.

FIG. 14D shows how each cell in the original mask has parts of four cells in the rotated mask. Cell 200 is at X3, Y1 is for multi-view mask #3 in the original mask of FIG. 14A. The sub-pixel in the original or source image at this location is passed through for multi view #3, but is blocked for the 7 other multi views when mask are applied.

Original cell 200 overlaps portions of four rotated cells 202, 204, 206, 208. Rotated cell 202 is for mask #3. Rotated cell 204 is for mask #4. Rotated cell 206 is for mask #3. Rotated cell 208 is for mask #5. Original cell 200 will contain parts of rotated multi views #3, 4, 5.

For the target sub-pixel (x=3, y=1), reverse rotation is used to determine the pre-rotation view mask position (x=3.2, y=0.8). Based on the pre-rotation view mask position, the sub-pixel view mask for each view is computed. In this case, View 3, View 4 and View 5 are non-zero entries. Each of the multi views has a different sub-pixel offset due to the different disparities. View 3 has a sub-pixel offset of 2*(offset), View 4 has a sub-pixel offset of offset, View 5 has a sub-pixel offset of −1*offset. Assuming that offset is 3, view 3=6, view 4=3, view5=−3. They are proportioned based on a sub-pixel view mask. The proportioned sub-pixel offsets are applied to the source sub-pixel and sum to obtain a destination pixel.

FIG. 15 shows view synthesis with a stored rotated mask. The original source image 120 has pixel data and disparities that may be calculated from the depth map. Sub-pixel positions for each of the multi views are calculated based on the depth, step 122, as described earlier for FIG. 11. A rotated mask that was generated from the original or base mask and stored is read, step 124. The sub-pixels in the source image may then be masked with the rotated mask, step 126 to form the destination or output multi-view image.

A typical base mask is a repeating 8 by 8 mask covering 24 RGB components in 8 rows. Three RGB components make up each pixel. To store this mask in memory, 576-bit values (64 pixel×3 sub-pixel/pixel×3 bit view #) indicating which view goes to which RGB component are stored. Since the 8 by 8 mask is repeated, only 64 values need to be stored, not the full number of pixels in the much larger image.

However, when the mask is rotated, multiple views can fall into a single sub-pixel location and the repeating unit is no longer an 8 by 8 mask. To store the whole rotated mask would require much more memory. To solve this memory storage problem for rotated masks, the inventors generate rotated masks on the fly.

When rotated masks are used, forward mapping is avoided because forward mapping involves storage of intermediate views that span multiple lines. Storage requirement for the multiple lines is high, so backward mapping is used with rotated masks.

Figure 16:
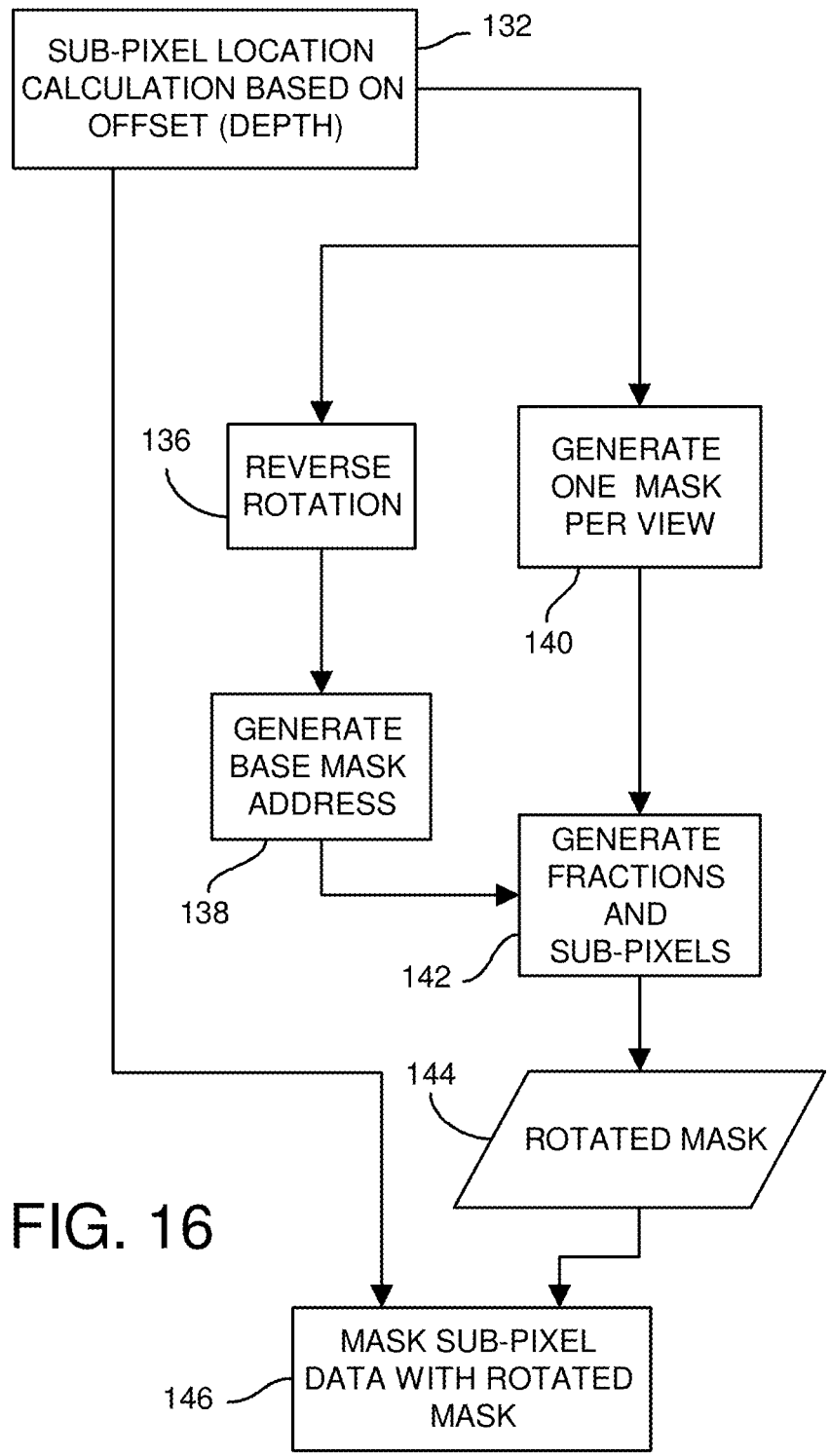
FIG. 16 shows view synthesis with a dynamically-generated reverse rotated mask.

FIG. 16 shows view synthesis with a dynamically-generated reverse rotated mask. The rotated mask does not have to be stored. The original sourced image 132 has pixel data and disparities that may be calculated from the depth map.

One base mask is generated for each of the multi views, step 140. In some embodiments, only a single mask is generated, and this single mask is accessed multiple times and used for all views. Similar to backward mapping, this process changes pixels into RGB components (sub-pixels) which are used. Each sub-pixel comes from a different combination of views.

Reverse rotation is performed on the sub-pixel positions, step 136, to find the source sub-pixel location in the source image. Reverse rotation uses geometric scaling such as trigonometric functions to calculate the original sub-pixel positions from the output sub-pixel locations given an angle of mask rotation. Addresses in the base mask are generated, step 138.

If the base mask is 8 columns by 8 rows, the sub-pixel base mask will be 24 columns by 8 rows. The modulus of the reverse rotated sub-pixel address is generated to obtain the base mask address in step 138. This base mask address is usually fractional. The base mask address is used in step 142 to generate rotated mask 144 for the destination sub-pixel address.

In step 142, a linear combination of the mask is based on the fraction of the base mask address. For example, if the base mask address is x=3.5, y=4.5, then the rotated mask is 0.25* (x=3, y=4)+0.25(x=3, y=5)+0.25*(x=4, y=4)+0.25(x=4, y=5). The same fractions for each view generated for rotated mask 144 are used in step 136 to generate the multi view image.

The sub-pixels in the source image may then be masked with the rotated mask, step 146, to form the destination or output multi-view image.

Rotated masks require the use of fractions indicating which views are present for each sub-pixel, such as 0.3 for View 1, 0.5 for view2, 0.2 for view 3, and 0 for the remaining views. Rather that reading a stored rotated mask as in step 124 of FIG. 15, the rotated mask is generated on the fly, using storage of just the base mask.

Alternate Embodiments

Several other embodiments are contemplated by the inventors. For example rather than searching all pixels for a match, only a window may be searched. The window could be rectangular or could have other shapes, such as a patch. Larger areas of the image could be defined, such as texture-less areas, and different routines or parameters applied in these areas. Stereo-matching and other routines may use a variety of algorithms and techniques, and many variations are possible. While N=9 forward views have been described as the threshold for hybrid view synthesis, another threshold N such as 4 views or 12 views may be substituted. N may be matched to the number of forward processing units available in the hardware.

Fallback may not necessary be a depth map generated from a 2D image or single view, but may be from an alternative depth generation method that is more stable than traditional stereomatching. There may be other fallback candidates that use both 2D and 3D images, using both left and right images, depending on stability.

Routines, procedures, flows, blocks, and other components may be implemented as hardware logic gates, execution of a routine on a graphics processor, on a general-purpose processor, or by using other engines.

Since the disparity and depth are inversely proportional to each other, a disparity map could be used rather than a depth map at various locations in routines and hardware. Thus a disparity map may be substituted for a depth map, and a depth map may be substituted for a disparity map. The disparity map and the depth map are thus equivalents since they both capture the same data, but are expressed in different ways. The disparity may be expressed as an X value, where each pixel is located at an x, y coordinate, a number of pixels, or a multiple of a number of pixels, such as blocks of 5 pixels, or may be scaled. Likewise, the depth may be scaled. Either depth maps or disparity maps may be used in steps 110, 112 of FIG. 5.

Offset and disparity are similar terms. Disparity seems to imply a distance between 2 objects, or between a pixel in a right and a left view, while offset is a distance from an object (pixel) to a reference central object (location). A single disparity value that is defined for stereo (two) images may be multiplied or scaled by different amounts to generate more than two offsets for more than two multiple views.

The stereo images may be rectified to account for camera angles to convert the images to standard form. Once rectified, disparity or parallax of an object between stereo images should occur along a single row of the image. Thus rather than searching a multi-row rectangular region for a matching pixel, only a single row needs to be searched, reducing computations. Information obtained during camera calibration may be used to improve rectification. Other pre-processing may include filtering such as bilateral filtering or Laplacian or Gaussian filtering, averaging nearby pixels, etc. Costs may be averaged over an area or region by using sum-of-the-absolute difference (SAD), sum-of-squared difference (SSD), sum of truncated absolute differences, (STAD), etc. The cost function may be an energy function. Window sizes for regions may vary and may have non-rectangular or even adaptive shapes. Outlier values may be discarded or filtered out.

The stereo-matching rate could be defined, expressed, or calculated in other ways, such as by summing the disparity differences for all pixels in a region, rather than comparing each pixel's disparity difference to the consistency threshold. The sum could then be compared to an aggregate consistency threshold for that region. Many other variations are possible. While a stereo-matching rate threshold of 65% and a variation threshold of 10% have been described, other values could be used, and these values may be adjusted. Similarly, the distance threshold and other values may be adjusted. Each region or subset of regions in the image may have different threshold values.

Other inputs such as another frame may be used to detect depth cues such as object motion (closer objects appear to move faster), occlusion/disocclusion (foreground objects cover background objects), etc. The prior frame may be the frame before the current frame, or frames may be skipped and the prior frame may be two or more frames before the current frame. Down-sampling may result in each pixel being processed to represent four or more pixels in the original image.

Various values of thresholds may be used. Intermediate values may be buffered, inverted, adjusted, or otherwise modified for a variety of purposes. Rather than reducing costs when the lowest-cost pixel location between two frames are within the distance threshold, costs could be raised when the lowest-cost pixel location between two frames more than the distance threshold apart, since these are equivalents. Costs could be reduced or increased by a more complex function than by the bias factor. The bias factor and thresholds could be adjusted for different kinds or videos, different areas of the image, such as for regions with low texture, etc. While sub-pixels have been described as being one of the three primary color components such as R, G, B or Y, U, V, the sub-pixel could also be the smallest addressable unit.

The background of the invention section may contain background information about the problem or environment of the invention rather than describe prior art by others. Thus inclusion of material in the background section is not an admission of prior art by the Applicant.

Any methods or processes described herein are machine-implemented or computer-implemented and are intended to be performed by machine, computer, or other device and are not intended to be performed solely by humans without such machine assistance. Tangible results generated may include reports or other machine-generated displays on display devices such as computer monitors, projection devices, audio-generating devices, and related media devices, and may include hardcopy printouts that are also machine-generated. Computer control of other machines is another tangible result.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A multi-view synthesizer comprising:
    a first depth generator that generates a first depth map by stereo-matching a first stereo image to a second stereo image;
    a consistency checker that generates a stereo-matching rate indicating a quality of the first depth map, the consistency checker comparing matched pixel locations when starting with the first stereo image to pixel locations when starting with the second stereo image to generate the stereo-matching rate;
    a second depth generator that generates a second depth map from no more than one single view image;
    a disparity fallback selector that selects the second depth map as a selected depth map instead of the first depth map when the stereo-matching rate is below a matching threshold;
    a forward mapper that shifts sub-pixels from a source image by an offset to generate a destination image, the offset being read from or generated from the selected depth map, wherein the offset is scaled to a different value for each view image in a plurality of multi view images output as the destination image; and
    a backward mapper that reads a plurality of view masks to locate a selected view mask that generates a sub-pixel location in the destination image, and locates a source sub-pixel in the source image using a view offset for the selected view mask, the backward mapper generating the destination image by copying the source sub-pixel to the sub-pixel location in the destination image.

2. The multi-view synthesizer of claim 1 further comprising:
    a hybrid mapper that activates the forward mapper to generate destination images as intermediate images, and activates the backward mapper to use the intermediate images as the source image to generate the destination image as an output image.

3. The multi-view synthesizer of claim 1 further comprising:
    a mask rotator that rotates a view mask by an angle to generate a rotated view mask for use by the backward mapper;
    wherein view masks are stored in a memory while the rotated view mask is generated and not stored in the memory.

4. The multi-view synthesizer of claim 3 wherein the mask rotator further comprises:
    a sub-pixel calculator that calculates locations of Red, Blue, and Green sub-pixels;

a reverse rotator that rotates locations of the Red, Blue, and Green sub-pixels to generate fractional sub-pixel locations;

an address generator that generates base sub-pixel addresses in a base mask for the fractional sub-pixel locations; and an adder that adds fractions of sub-pixels in the base mask read at the base sub-pixel addresses to generate the rotated view mask.

5. The multi-view synthesizer of claim 1 further comprising:

a frame delay buffer that stores the selected depth map from the disparity fallback selector that was generated in a prior frame;

whereby depth maps are generated for a prior frame and delayed by the frame delay buffer for use by the forward mapper and the backward mapper in a current frame.

6. The multi-view synthesizer of claim 1 further comprising:

a low-cost temporal coherence adjustor that reduces costs used to generate the first depth map when a matched pixel location in a current frame is less than a distance threshold from the matched pixel location in a prior frame.

7. The multi-view synthesizer of claim 1 further comprising:

a frame-to-frame disparity fallback selector that selects the second depth map as the selected depth map when a difference between the stereo-matching rate in a current frame and the stereo-matching rate in a prior frame is more than a variation threshold.

8. The multi-view synthesizer of claim 1 further comprising:

a downsampler that down-samples a high-resolution input image to generate the first stereo image and the second stereo image having a lower resolution than the high-resolution input image;

wherein the one single view image input to the second depth generator is the first stereo image.

9. The multi-view synthesizer of claim 1 further comprising:

a cost generator that compares a reference pixel from the first stereo image to a range of pixels surrounding a reference location that corresponds to the reference pixel in the second stereo image to generate a plurality of costs;

an optimizer that selects as a matching pixel location in the second stereo image a pixel location having a lowest cost in the plurality of costs.

10. The multi-view synthesizer of claim 1 further wherein the selected depth map comprises depth values, disparity values, or offsets for pixels in an image.

11. A method for generating an output depth map from a first view image and a second view image comprising:

generating a first depth map from the first and second view images, wherein depth values in the first depth map are generated based on disparities generated by matching pixels in the first view image with pixels in the second view image, a disparity indicating a shift in position of a matching pixel in the first view image and in the second view image;

determining a stereo-matching rate when generating the first depth map, the stereo-matching rate indicating a consistency of results when the first view image and the second view image are reversed as inputs during generation of the first depth map;

generating a second depth map from the first view image, wherein depth values in the second depth map are generated based on visual cues in the first view image without any input from the second view image;

selecting the first depth map as the output depth map when the stereo-matching rate is above a match threshold; and selecting the second depth map as the output depth map when the stereo-matching rate is not above the match threshold.

12. The method of claim 11 further comprising:

wherein the first view image and the second view image are for a current frame in a video sequence of frames, and wherein the stereo-matching rate is for the current frame;

storing the stereo-matching rate for a prior frame in the video sequence;

comparing the stereo-matching rate for the prior frame to the stereo-matching rate for the current frame to generate a rate variation between the current frame and the prior frame;

when the rate variation exceeds a variation threshold, selecting the second depth map as the output depth map, whereby larger frame-to-frame variations in stereo-matching rates cause fallback to the second depth map generated without stereo-matching.

13. The method of claim 11 further comprising:

dividing a current frame into a plurality of regions;

selecting the second depth map for pixels in a target region in the plurality of regions for inclusion in the output depth map when the stereo-matching rate for the target region is not above the match threshold, wherein the output depth map contains multiple regions, some regions having portions of the first depth map and other regions having portions of the second depth map.

14. The method of claim 13 further comprising:

adjusting the match threshold to have different threshold values for different regions in the plurality of regions, whereby different match thresholds are used for different regions.

15. The method of claim 13 further comprising:

determining when a region in the plurality of regions is a textureless region having a low variation of pixels within the region;

selecting the second depth map for pixels in the textureless region in the plurality of regions for inclusion in the output depth map.

16. The method of claim 11 further comprising forward mapping by:

generating offsets from values stored in the output depth map, wherein an offset for a sub-pixel location is scaled by a plurality of scale factors to generate a plurality of view offsets for each sub-pixel location;

shifting sub-pixels in a source image by the view offsets to generate a plurality of view images;

filling holes having no sub-pixel in a sub-pixel location in the plurality of view images;

masking out colors that are not present in a view image to generate a plurality of masked view images from the plurality of view images; and summing the plurality of view images to generate a multi-view image for output to a three-dimensional display;

and further comprising backward mapping by:

generating offsets from values stored in the output depth map, wherein an offset for a sub-pixel location is scaled by a plurality of scale factors to generate a plurality of view offsets for each sub-pixel location;

for each output sub-pixel location in an output image:
   determining a generating view mask in the plurality of view masks that generates an output sub-pixel in the output sub-pixel location;
   obtaining a generating scale factor for the generating view mask;
   reading the output depth map to obtain a target offset for the output sub-pixel location;
   multiplying the target offset by the generating scale factor to generate a view-adjusted offset;
   adding the view-adjusted offset to the output sub-pixel location to generate a source sub-pixel address;
   reading a target source sub-pixel from the source image and copying the target source sub-pixel to the output sub-pixel location in the output image; and
repeating for other sub-pixel locations in the output image until the output image is built.

17. The method of claim 16 further comprising:
using forward mapping to generate a first plurality of views;
using backward mapping to generate a second plurality of views when a total number of views exceeds a view threshold, wherein the view threshold is at least 2 views.

18. A multi-view system comprising:
a first map generator that receives a first view image and a second view image, the first view image and the second view image being different view perspectives of a same captured image, the first map generator generating a first map having disparity or depth values for pixels, the disparity values indicating a shift in pixel position between the first view image and the second view image, wherein the disparity values are inversely proportional to the depth values;
a second map generator that receives the first view image and not the second view image, the second map generator using a non-stereo technique to generate depth values or disparity values for inclusion in a second map;
wherein the first map is generated using a stereo image technique while the second map is generated using a non-stereo technique;
a stereo-matching rate generator that generates a stereo-matching rate when the first map generator generates the disparity or depth values;
a disparity fallback selector that selects values from the second map for inclusion in an output map when the stereo-matching rate is below a rate threshold, and selects values from the first map for inclusion in the output map when the stereo-matching rate is above the rate threshold;
a cost generator that generates matching costs for pixels in the first view image being matched to pixels in the second view image;
an optimizer that selects a winning pixel location having a lowest matching cost; and
a low-cost temporal coherence adjustor that adjusts the matching costs when the winning pixel location for a current frame is within a distance threshold of the winning pixel location for a prior frame.

19. The multi-view system of claim 18 wherein the disparity fallback selector further selects values from the second map for inclusion in the output map when the stereo-matching rate for the current frame is more than a variation threshold from the stereo-matching rate of the prior frame,
   whereby larger frame-to-frame stereo-matching rate variation falls back to the second map.

20. The multi-view system of claim 18 further comprising:
a forward mapper that shifts a sub-pixel in the first view image by a scaled view offset that is generated from a value in the output map to generate an output image;
a backward mapper that identifies an identified view mask that generates a sub-pixel location in the output image, and generates a view adjusted offset that is based on the identified view mask and values in the output map, and uses the view adjusted offset to find a source sub-pixel in the first view image to copy to the output image; and
a hybrid mapper that activates the forward mapper to generate a first plurality of views, and activates the backward mapper to generate a second plurality of views, when a total number of views exceeds a view threshold, wherein the view threshold is at least 2 views.

* * * * *